(12) United States Patent
Liu et al.

(10) Patent No.: US 12,143,873 B2
(45) Date of Patent: Nov. 12, 2024

(54) MOBILITY ROBUSTNESS IMPLEMENTATION METHOD, DEVICE, AND APPARATUS

(71) Applicant: DATANG MOBILE COMMUNICATIONS EQUIPMENT CO., LTD., Beijing (CN)

(72) Inventors: Aijuan Liu, Beijing (CN); Jing Fu, Beijing (CN); Nan Yan, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 363 days.

(21) Appl. No.: 17/635,069

(22) PCT Filed: Aug. 12, 2020

(86) PCT No.: PCT/CN2020/108702
§ 371 (c)(1),
(2) Date: Feb. 14, 2022

(87) PCT Pub. No.: WO2021/031959
PCT Pub. Date: Feb. 25, 2021

(65) Prior Publication Data
US 2022/0295358 A1 Sep. 15, 2022

(30) Foreign Application Priority Data
Aug. 16, 2019 (CN) .......................... 201910760398.1

(51) Int. Cl.
*H04W 36/00* (2009.01)
*H04W 36/14* (2009.01)
*H04W 36/30* (2009.01)

(52) U.S. Cl.
CPC ..... *H04W 36/0058* (2018.08); *H04W 36/144* (2023.05); *H04W 36/302* (2023.05)

(58) Field of Classification Search
CPC ....... H04W 36/0058; H04W 36/00837; H04W 36/14; H04W 36/30; H04W 24/02; H04W 24/08; H04W 36/302; H04W 36/144
See application file for complete search history.

(56) References Cited

U.S. PATENT DOCUMENTS

| 10,390,266 B2 | 8/2019 | Won et al. |
| 2012/0165023 A1 | 6/2012 | Park et al. |

(Continued)

FOREIGN PATENT DOCUMENTS

| CN | 101534518 A | 9/2009 |
| CN | 102325354 A | 1/2012 |

(Continued)

OTHER PUBLICATIONS

HiSilicon Huawei, "Cell quality derivation from multiple beams," 3GPP TSG-RAN WG2#98, R2-1704877, Hangzhou, China (May 15-May 19, 2017).

(Continued)

*Primary Examiner* — Mandish K Randhawa
(74) *Attorney, Agent, or Firm* — Meunier Carlin & Curfman LLC

(57) ABSTRACT

Embodiments of the present application provide a mobility robustness implementation method, a device, and an apparatus, used to detect unnecessary handover from a 5GS to an EPS. The method comprises: a first network-side apparatus determining first measurement information after a terminal has performed inter-system handover; and sending the determined first measurement information to a second network-side apparatus, such that the second network-side apparatus notifies, according to the first measurement information, the terminal to continue measuring a cell signal under a source system of the inter-system handover. In the method, when inter-system handover occurs, the first network-side apparatus enables the terminal to continue measuring the cell (Continued)

signal under the source system by means of the first measurement information, thereby determining whether the terminal has performed an unnecessary handover.

15 Claims, 8 Drawing Sheets

(56) References Cited

U.S. PATENT DOCUMENTS

| | | |
|---|---|---|
| 2015/0172982 A1 | 6/2015 | Park et al. |
| 2015/0304907 A1* | 10/2015 | Centonza .......... H04W 36/0066 |
| | | 455/436 |
| 2016/0105831 A1 | 4/2016 | Masini et al. |
| 2016/0198373 A1 | 7/2016 | Thangarasa et al. |
| 2021/0274399 A1* | 9/2021 | Gao .................. H04W 36/0094 |

FOREIGN PATENT DOCUMENTS

| | | |
|---|---|---|
| CN | 102984774 A | 3/2013 |
| CN | 104754616 A | 7/2015 |
| CN | 106465221 A | 2/2017 |
| KR | 20140131532 A | 11/2014 |
| WO | 2013127480 A1 | 9/2013 |
| WO | 2016072903 A | 5/2016 |

OTHER PUBLICATIONS

Huawei, "Conclusion for Mobility Optimisation," 3GPP TSG-RAN3 Meeting #104, R3-193085, Reno, Nevada (May 13-May 2019).
Potevio, Text modification for TR 36.300 regarding ass new function for MRO, 36PP TSG-RAN2 Meeting #70-bis, R3-110125, Jan. 11, 2011, pp. 4-5.

* cited by examiner

MOBILITY ROBUSTNESS IMPLEMENTATION METHOD, DEVICE, AND APPARATUS

CROSS REFERENCE TO RELATED APPLICATIONS

The present application is a National Stage of International Application No. PCT/CN2020/108702, filed on Aug. 12, 2020, which claims priority to Chinese patent application No. 201910760398.1 filed on Aug. 16, 2019 to the China Patent Office, and entitled "MOBILITY ROBUSTNESS IMPLEMENTATION METHOD, DEVICE, AND APPARATUS", the entire content of which is incorporated herein by reference.

FIELD

The present application relates to the field of communications, in particular to a mobility robustness method, apparatus and device.

BACKGROUND

Detection and notification of the problem of unnecessary handover (unnecessary HO) are introduced into a long term evolution (LTE) system. However, since a measurement manner different from the LTE system and other contents are introduced into a 5G new radio (NR) system, there is no specific detection method for unnecessary HO from a $5^{th}$ generation system (5GS) to an evolved packet system (EPS).

SUMMARY

Embodiments of the present application provide a mobility robustness method, apparatus and device, used to detect unnecessary handover (unnecessary HO) from a 5GS to an EPS.

In a first aspect, an embodiment of the present application provides a mobility robustness method, including: determining, by a first network device, first measurement information after a terminal performs inter-system handover; and sending, by the first network device, the first measurement information to a second network device, to enable the second network device to notify the terminal to continue measuring a cell signal under a source system of the inter-system handover according to the first measurement information; where the first network device belongs to a source cell of the inter-system handover, and the second network device belongs to a target cell of the inter-system handover.

In the above method, when the inter-system handover occurs, the first network device enables the terminal to continue measuring the cell signal under the source system through the first measurement information, to thereby determine whether unnecessary HO occurs to the terminal.

Optionally, after the sending, by the first network device, the first measurement information to the second network device, the method further includes: in a case that the first network device receives the unnecessary HO sent by the second network device, determining that the unnecessary HO occurs when the terminal performs the inter-system handover, where the unnecessary HO carries a cell identifier of a cell, meeting a first condition, in cells of the source system.

In the above method, when the unnecessary HO occurs during the inter-system handover, the device of the source cell knows that the unnecessary HO occurs to the terminal.

Optionally, the first measurement information includes part or all of the following: a frequency point needing to be measured by the terminal, measurement time of the terminal, a threshold value of beams, the number of beams greater than a threshold value of beams needing to be measured by the terminal, a threshold value of a cell level, a threshold value of beams obtaining cell signal quality and the maximum number of beams exceeding a threshold value.

In the above method, the terminal measures the cell signal under the source system through the first measurement information, and thus the network device is able to determine whether the unnecessary HO occurs to the terminal.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level; and in a case that the first measurement information includes the threshold value of the beams and the number of the beams greater than the threshold value of the beams needing to be measured by the terminal, the first condition includes that the measured number of beams greater than the threshold value of the beams is greater than or equal to a preset threshold.

In the above method, whether the unnecessary HO occurs to the terminal is determined according to the first measurement information and a measurement result of the terminal.

Optionally, after the sending, by the first network device, the first measurement information to the second network device, the method further includes: in a case that the first network device receives unnecessary HO sent by a third network device, determining that the unnecessary HO occurs when the terminal performs the inter-system handover, where the unnecessary HO carries a cell identifier of a cell, meeting a second condition, in cells of the source system; where the cell meeting the second condition is determined by the third network device after receiving second measurement information sent by the second network device, the second measurement information is sent by the second network device after the intra-system handover is performed within measurement time of the terminal measuring the cell signal under the source system, and the third network device belongs to a target cell of the intra-system handover.

In the above method, after the terminal performs the inter-system handover, and when intra-system handover occurs during measuring the cell signal of the source system, the terminal is continuously notified to measure the cell signal of the source system during the inter-system handover so as to determine whether the unnecessary HO occurs to the terminal. In addition, one or more cells of the source system of the inter-system handover also know whether the unnecessary HO occurs to the terminal.

Optionally, in a case that the second measurement information includes a threshold value of a cell level, a threshold value of beams obtaining cell signal quality and the maximum number of beams exceeding the threshold value, the second condition includes that cell signal quality measured within a preset duration is greater than or equal to the threshold value of the cell level; and in a case that the second measurement information includes a threshold value of beams and the number of beams greater than a threshold value of beams needing to be measured by the terminal, the second condition includes that the measured number of beams greater than the threshold value of the beams is greater than or equal to a preset threshold.

In the above method, whether the unnecessary HO occurs to the terminal can be determined according to the second measurement information and the measurement result of the terminal.

In a second aspect, an embodiment of the present application provides a mobility robustness method, including: receiving, by a second network device, first measurement information sent by a first network device after a terminal performs inter-system handover; and notifying, by the second network device, the terminal to continue measuring a cell signal under a source system of the inter-system handover according to the first measurement information; where the first network device belongs to a source cell of the inter-system handover, and the second network device belongs to a target cell of the inter-system handover.

Optionally, after the notifying, by the second network device, the terminal to continue measuring the cell signal under the source system of the inter-system handover according to the first measurement information, the method further includes: receiving a measurement result sent by the terminal; and in a case that unnecessary HO occurs to the terminal, the unnecessary HO is sent to the first network device. The unnecessary HO carries a cell identifier of a cell, meeting a first condition, in cells of the source system.

Optionally, the first measurement information includes part or all of the following: a frequency point needing to be measured by the terminal, measurement time of the terminal, a threshold value of beams, the number of beams greater than a threshold value of beams needing to be measured by the terminal, a threshold value of a cell level, a threshold value of beams obtaining cell signal quality and a maximum number of beams exceeding the threshold value.

Optionally, determining that the unnecessary HO occurs to the terminal includes: in a case that the first measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determining that the unnecessary HO occurs to the terminal; where the first condition includes that the cell signal quality measured within the preset duration is greater than or equal to the threshold value of the cell level; or in a case that the first measurement information includes the threshold value of the beams and the number of the beams greater than the threshold value of the beams needing to be measured by the terminal, and the measured number of beams greater than the threshold value of the beams in the measurement result is greater than or equal to a preset threshold, determining that the unnecessary HO occurs to the terminal; where the first condition includes that the measured number of the beams greater than the threshold value of the beams is greater than or equal to the preset threshold.

Optionally, after the second network device notifies the terminal to continue measuring the cell signal under the source system of the inter-system handover according to the first measurement information, the method further includes: determining, by the second network device, second measurement information after the terminal performs the intra-system handover; and sending, by the second network device, the second measurement information to a third network device, to enable the third network device to notify the terminal to continue measuring the cell signal under the source system of the inter-system handover according to the second measurement information.

The third network device belongs to a target cell of the intra-system handover.

Optionally, the second measurement information includes part or all of the following: a frequency point needing to be measured by the terminal, remaining measurement time of the terminal, a threshold value of beams, the number of beams greater than a threshold value of beams needing to be measured by the terminal, a threshold value of a cell level, a threshold value of beams obtaining cell signal quality and a maximum number of beams exceeding the threshold value, a cell identifier of a source cell of the inter-system handover, and a cell identifier of a cell meeting a first condition; where the cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level; and in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

In a third aspect, an embodiment of the present application provides a mobility robustness method, including: receiving, by a third network device, second measurement information sent by a second network device after a terminal performs intra-system handover; and notifying, by the third network device, the terminal to continue measuring a cell signal under a source system of the inter-system handover according to the second measurement information; where the second network device belongs to a target cell of the inter-system handover, and belongs to a source cell of the intra-system handover; and the third network device belongs to a target cell of the intra-system handover.

Optionally, the third network device is able to determine whether unnecessary HO occurs to the terminal during the inter-system handover according to cell signal quality under the source system when the terminal is notified to continue measuring the inter-system handover according to the second measurement information.

Optionally, after the notifying, by the third network device, the terminal to continue measuring the cell signal under the source system of the inter-system handover according to the second measurement information, the method further includes: receiving a measurement result sent by the terminal; and in a case that unnecessary HO occurs to the terminal, sending the unnecessary HO to a first network device; where the unnecessary HO carries a cell identifier of a cell, meeting a second condition, in cells of the source system.

Optionally, the second measurement information includes part or all of the following: a frequency point needing to be measured by the terminal, remaining measurement time of the terminal, a threshold value of beams, the number of beams greater than a threshold value of beams needing to be measured, a threshold value of a cell level, a threshold value of beams obtaining cell signal quality and the maximum number of beams exceeding the threshold value, a source cell identifier of the inter-system handover, and a cell identifier of a cell, meeting a first condition, in cells of the source system; where the cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, determining that the unnecessary HO occurs to the terminal includes: in a case that the second measurement information comprises the threshold value of the cell level, the threshold value of the beams obtaining the cell signal quality and the maximum quantity of the beams exceeding the threshold value, and cell signal quality measured within a preset duration in the measurement result is greater than or equal to the threshold value of the cell level, determining that the unnecessary HO occurs to the terminal, where the second condition includes that the cell signal quality measured within the preset duration is greater than or equal to the threshold value of the cell level; or in a case that the second measurement information includes the threshold value of the beams and the number of the beams greater than the threshold value of the beams needing to be measured by the terminal, and the measured number of beams greater than the threshold value of the beams in the measurement result is greater than or equal to a preset threshold, determining that the unnecessary HO occurs to the terminal, where the second condition includes that the measured number of the beams greater than the threshold value of the beams is greater than or equal to the preset threshold.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level; and in a case that the first measurement information includes the threshold value of the beams and the number of the beams greater than the threshold value of the beams needing to be measured by the terminal, the first condition includes that the measured number of beams greater than the threshold value of the beams is greater than or equal to a preset threshold.

In a fourth aspect, an embodiment of the present application provides a mobility robustness method, including: receiving, by a terminal, a notification, sent by a second network device, of continuing measuring a cell signal under a source system of inter-system handover after performing the inter-system handover; and measuring, by the terminal, the cell signal under the source system according to the notification sent by the second network device; where the second network device belongs to a target cell of the inter-system handover.

Optionally, the notification sent by the second network device further includes: first measurement information, where the first measurement information includes part or all of the following: a frequency point needing to be measured by the terminal, measurement time of the terminal, a threshold value of beams, the number of beams greater than a threshold value of beams needing to be measured by the terminal, a threshold value of a cell level, a threshold value of beams obtaining cell signal quality and a maximum number of beams exceeding a threshold value.

The terminal sends a measurement result to the second network device.

Optionally, after the measuring, by the terminal, the cell signal under the source system according to the notification sent by the second network device, the method further includes: receiving, by the terminal, a notification sent by a third network device, of measuring the cell signal under the source system after performing the intra-system handover when the cell signal under the source system is measured; and measuring, by the terminal, the cell signal under the source system according to the notification sent by the third network device.

The third network device belongs to a target cell of the intra-system handover.

Optionally, the notification sent by the third network device further includes: second measurement information, where the second measurement information includes part or all of the following: a frequency point needing to be measured by the terminal, remaining measurement time of the terminal, a threshold value of beams, the number of beams greater than a threshold value of beams needing to be measured by the terminal, a threshold value of a cell level, a threshold value of beams obtaining cell signal quality and a maximum number of beams exceeding the threshold value, a cell identifier of the source cell of the inter-system handover, and a cell identifier of a cell meeting the first condition.

The cell meeting the first condition is determined by the second network device after receiving first measurement information sent by the first network device, the first measurement information is sent by the first network device after the terminal performs the inter-system handover, and the first network device belongs to the source cell of the inter-system handover.

The terminal sends a measurement result to the third network device.

Optionally, in a case that the first measurement information includes a threshold value of a cell level, a threshold value of beams obtaining cell signal quality and the maximum number of beams exceeding a threshold value, the first condition includes that the cell signal quality measured within the preset duration is greater than or equal to the threshold value of the cell level; and in a case that the first measurement information includes a threshold value of beams and the number of the beams greater than a threshold value of beams needing to be measured by the terminal, the first condition includes that the measured number of beams greater than the threshold value of the beams is greater than or equal to a preset threshold.

In a fifth aspect, an embodiment of the present application provides a first network device, including: a processor and a memory; where the processor is configured to read programs in the memory and execute the following processes: determining first measurement information after a terminal performs inter-system handover; and sending the first measurement information to a second network device, to enable the second network device to notify the terminal to continue measuring a cell signal under a source system of the inter-system handover according to the first measurement information; where the first network device belongs to a source cell of the inter-system handover, and the second network device belongs to a target cell of the inter-system handover.

Optionally, the processor is further configured to: in a case that the first network device receives unnecessary HO sent by the second network device after sending the first measurement information to the second network device, determine that the unnecessary HO occurs when the terminal performs the inter-system handover, where the unnecessary HO carries a cell identifier of a cell, meeting a first condition, in cells of the source system.

Optionally, the first measurement information includes part or all of the following: a frequency point needing to be measured by the terminal, measurement time of the terminal, a threshold value of beams, the number of beams greater than a threshold value of beams needing to be measured by the terminal, a threshold value of a cell level, a threshold value of beams obtaining cell signal quality and the maximum number of beams exceeding a threshold value.

Optionally, the first measurement information includes part or all of the following: a frequency point needing to be measured by the terminal, the measurement time of the terminal, the threshold value of the beams, the number of beams greater than the threshold value of the beams needing to be measured by the terminal, the threshold value of the cell level, the threshold value of the beams obtaining the cell signal quality and the maximum number of the beams exceeding the threshold value.

Optionally, the processor is further configured to: in a case that unnecessary HO sent by a third network device is received after the first measurement information is sent to the second network device, determine that the unnecessary HO occurs when the terminal performs the inter-system handover, where the unnecessary HO carries a cell identifier of a cell, meeting a second condition, in cells of the source system; where the cell meeting the second condition is determined by the third network device after receiving second measurement information sent by the second network device, the second measurement information is sent by the second network device after intra-system handover is performed within measurement time of the terminal measuring the cell signal under the source system, and the third network device belongs to the target cell of the intra-system handover.

Optionally, in a case that the second measurement information includes a threshold value of a cell level, a threshold value of beams obtaining cell signal quality and a maximum number of beams exceeding the threshold value, the second condition includes that cell signal quality measured within a preset duration is greater than or equal to the threshold value of the cell level; and in a case that the second measurement information includes the threshold value of the beams and the number of the beams greater than the threshold value of the beams needing to be measured by the terminal, the second condition includes that the measured number of beams greater than the threshold value of the beams is greater than or equal to a preset threshold.

In a sixth aspect, an embodiment of the present application provides a second network device, including: a processor and a memory; where the processor is configured to read programs in the memory and execute the following processes: receiving first measurement information sent by a first network device after a terminal performs inter-system handover; and notifying the terminal to continue measuring a cell signal under a source system of the inter-system handover according to the first measurement information; where the first network device belongs to a source cell of the inter-system handover, and the second network device belongs to a target cell of the inter-system handover.

Optionally, the processor is further configured to: receive a measurement result sent by the terminal after notifying the terminal to continue measuring the cell signal under the source system of the inter-system handover according to the first measurement information; and in a case that unnecessary HO occurs to the terminal, send the unnecessary HO to the first network device, where the unnecessary HO carries a cell identifier of a cell, meeting a first condition, in cells of the source system.

Optionally, the first measurement information includes part or all of the following: a frequency point needing to be measured by the terminal, measurement time of the terminal, a threshold value of beams, the number of beams greater than a threshold value of beams needing to be measured by the terminal, a threshold value of a cell level, a threshold value of beams obtaining cell signal quality and a maximum number of beams exceeding the threshold value.

Optionally, the processor is further configured to: in a case that the first measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determine that the unnecessary HO occurs to the terminal, where the first condition includes that the cell signal quality measured within the preset duration is greater than or equal to the threshold value of the cell level; or in a case that the first measurement information includes the threshold value of the beams and the number of the beams greater than the threshold value of the beams needing to be measured by the terminal, and the measured number of beams greater than the threshold value of the beams in the measurement result is greater than or equal to a preset threshold, determine that the unnecessary HO occurs to the terminal, where the first condition includes that the measured number of the beams greater than the threshold value of the beams is greater than or equal to the preset threshold.

Optionally, the processor is further configured to: determine second measurement information after notifying the terminal to continue measuring the cell signal under the source system of the inter-system handover according to the first measurement information and after the terminal performs the intra-system handover; and send the second measurement information to a third network device to enable the third network device to notify the terminal to continue measuring the cell signal under the source system of the inter-system handover according to the second measurement information; where the third network device belongs to a target cell of the intra-system handover.

Optionally, the second measurement information includes part or all of the following: a frequency point needing to be measured by the terminal, remaining measurement time of the terminal, a threshold value of beams, the number of beams greater than a threshold value of beams needing to be measured by the terminal, a threshold value of a cell level, a threshold value of beams obtaining cell signal quality and the maximum number of beams exceeding the threshold value, a cell identifier of a source cell of the inter-system handover, and a cell identifier of a cell meeting a first condition; where the cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level; and in a case that the first measurement information includes the threshold value of the beams and the number of the beams greater than the threshold value of the beams needing to be measured by the terminal, the first condition includes that the measured number of the beams greater than the threshold value of beams is greater than or equal to a preset threshold.

In a seventh aspect, an embodiment of the present application provides a third network device, including: a processor and a memory; where the processor is configured to read programs in the memory and execute the following processes: receiving second measurement information sent by a second network device after a terminal performs intra-system handover; and notifying the terminal to continue measuring a cell signal under a source system of the inter-system handover according to the second measurement information; where the second network device belongs to a target cell of the inter-system handover, and belongs to a source cell of the intra-system handover; and the third network device belongs to a target cell of the intra-system handover.

Optionally, the processor is further configured to: receive a measurement result sent by the terminal after notifying the terminal to continue measuring the cell signal under the source system of the inter-system handover according to the second measurement information; and in a case that unnecessary HO occurs to the terminal, send the unnecessary HO to a first network device, where the unnecessary HO carries a cell identifier of a cell, meeting a second condition, in cells of the source system.

Optionally, the second measurement information includes part or all of the following: a frequency point needing to be measured by the terminal, remaining measurement time of the terminal, a threshold value of beams, the number of beams greater than a threshold value of beams needing to be measured, a threshold value of a cell level, a threshold value of beams obtaining cell signal quality and the maximum number of beams exceeding the threshold value, a source cell identifier of the inter-system handover, and a cell identifier of a cell, meeting a first condition, in cells of the source system; where the cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, the processor is further configured to: in a case that the second measurement information comprises the threshold value of the cell level, the threshold value of the beams obtaining the cell signal quality and the maximum quantity of the beams exceeding the threshold value, and cell signal quality measured within a preset duration in the measurement result is greater than or equal to the threshold value of the cell level, determine that the unnecessary HO occurs to the terminal; where the second condition includes that the cell signal quality measured within the preset duration is greater than or equal to the threshold value of the cell level; or in a case that the second measurement information includes the threshold value of the beams and the number of the beams greater than the threshold value of the beams needing to be measured by the terminal, and the measured number of beams greater than the threshold value of the beams in the measurement result is greater than or equal to a preset threshold, determine that the unnecessary HO occurs to the terminal, where the second condition includes that the measured number of the beams greater than the threshold value of the beams is greater than or equal to the preset threshold.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level; and in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

In an eighth aspect, an embodiment of the present application provides a terminal, including: a processor; and a memory; where the processor is configured to read programs in the memory and execute the following processes: receiving a notification, sent by a second network device, of continuing measuring a cell signal under a source system of inter-system handover after performing the inter-system handover; and measuring the cell signal under the source system according to the notification sent by the second network device; where the second network device belongs to a target cell of the inter-system handover.

Optionally, the notification sent by the second network device further includes: first measurement information, where the first measurement information includes part or all of the following: a frequency point needing to be measured by the terminal, measurement time of the terminal, a threshold value of beams, the number of beams greater than a threshold value of beams needing to be measured by the terminal, a threshold value of a cell level, a threshold value of beams obtaining cell signal quality and the maximum number of beams exceeding the threshold value.

The processor is further configured to: send a measurement result to the second network device.

Optionally, the processor is further configured to: receive a notification, sent by a third network device, of measuring the cell signal under the source system after measuring the cell signal under the source system according to the notification sent by the second network device and after performing the intra-system handover when measuring the cell signal under the source system; and measure the cell signal under the source system according to the notification sent by the third network device.

The third network device belongs to a target cell of the intra-system handover.

Optionally, the notification sent by the third network device further includes: second measurement information, where the second measurement information includes part or all of the following: a frequency point needing to be measured by the terminal, remaining measurement time of the terminal, a threshold value of beams, the number of beams greater than a threshold value of beams needing to be measured by the terminal, a threshold value of a cell level, a threshold value of beams obtaining cell signal quality and the maximum number of beams exceeding the threshold value, a cell identifier of the source cell of the inter-system handover, and a cell identifier of a cell meeting the first condition.

The cell meeting the first condition is determined by the second network device after receiving first measurement information sent by the first network device, the first measurement information is sent by the first network device after the terminal performs the inter-system handover, and the first network device belongs to the source cell of the inter-system handover.

The terminal sends the measurement result to the third network device.

Optionally, in a case that the first measurement information includes a threshold value of a cell level, a threshold value of beams obtaining cell signal quality and the maximum number of the beams exceeding the threshold value, the first condition includes that cell signal quality measured within a preset duration is greater than or equal to the threshold value of the cell level; and in a case that the first measurement information includes a threshold value of beams and the number of beams greater than a threshold value of beams needing to be measured by the terminal, the first condition includes that the measured number of beams greater than the threshold value of the beams is greater than or equal to a preset threshold.

In a ninth aspect, an embodiment of the present application provides a mobility robustness apparatus, including: a determining module, configured to determine first measurement information after a terminal performs inter-system handover; and a sending module, configured to send the first measurement information to a second network device, to enable the second network device to notify the terminal to continue measuring a cell signal under a source system of the inter-system handover according to the first measurement information; where the first network device belongs to a source cell of the inter-system handover, and the second network device belongs to a target cell of the inter-system handover.

Optionally, after the sending module sends the first measurement information to the second network device, the sending module is further configured to: in a case that the first network device receives unnecessary HO sent by the second network device, determine that the unnecessary HO occurs when the terminal performs the inter-system handover; where the unnecessary HO carries a cell identifier of a cell, meeting a first condition, in cells of the source system.

Optionally, the first measurement information includes part or all a the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding a threshold value.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level; and in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Optionally, after the sending module sends the first measurement information to the second network device, the sending module is further configured to: in a case that the first network device receives unnecessary HO sent by a third network device, determine that the unnecessary HO occurs when the terminal performs the inter-system handover; where the unnecessary HO carries a cell identifier of a cell, meeting a second condition, in cells of the source system; where the cell meeting the second condition is determined by the third network device after receiving second measurement information sent by the second network device, the second measurement information is sent by the second network device after the intra-system handover is performed within measurement time of the terminal measuring the cell signal under the source system, and the third network device belongs to a target cell of the intra-system handover.

Optionally, in a case that the second measurement information includes the threshold value of the cell level, the threshold value of the beams obtaining the cell signal quality and the maximum number of the beams exceeding the threshold value, the second condition includes that cell signal quality measured within a preset duration is greater than or equal to the threshold value of the cell level; and in a case that the second measurement information includes a threshold value of beams and the number of beams greater than a threshold value of beams needing to be measured by the terminal, the second condition includes that the measured number of the beams greater than the threshold value of the beams is greater than or equal to a preset threshold.

In a tenth aspect, an embodiment of the present application provides a mobility robustness apparatus, including: a first receiving module, configured to receive first measurement information sent by a first network device after a terminal performs inter-system handover; and a first notifying module, configured to notify the terminal to continue measuring a cell signal under a source system of the inter-system handover according to the first measurement information; where the first network device belongs to a source cell of the inter-system handover, and the second network device is a device to which a target cell of the inter-system handover.

Optionally, after the notifying, by the first notifying module, the terminal to continue measuring the cell signal under the source system of the inter-system handover according to the first measurement information, the first notifying module is further configured to: receive a measurement result sent by the terminal; and in a case that unnecessary HO occurs to the terminal, send the unnecessary HO to the first network device; where the unnecessary HO carries a cell identifier of a cell, meeting a first condition, in cells of the source system.

Optionally, the first measurement information includes part or all a the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

Optionally, determining, by the first notifying module, that the unnecessary HO occurs to the terminal includes: in a case that the first measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determining that the unnecessary HO occurs to the terminal; where the first condition includes that the cell signal quality measured within the preset duration is greater than or equal to the threshold value of the cell level; or in a case that the first measurement information includes the threshold value of the beams and the number of the beams greater than the threshold value of the beams needing to be measured by the terminal, and the measured number of the beams greater than the threshold value of the beams in the measurement result is greater than or equal to a preset threshold, determining that the unnecessary HO occurs to the terminal; where the first condition includes that the measured number of the beams greater than the threshold value of the beams is greater than or equal to the preset threshold.

Optionally, after the notifying, by the first notifying module, the terminal to continue measuring the cell signal under the source system of the inter-system handover according to the first measurement information, the first notifying module is further configured to: determine, by the second network device, second measurement information after the terminal performs intra-system handover; and send, by the second network device, the second measurement information to a third network device to enable the third network device to notify the terminal to continue measuring the cell signal under the source system of the inter-system handover according to the second measurement information; where the third network device belongs to a target cell of the intra-system handover.

Optionally, the second measurement information includes part or all a the following: a frequency point needing to be measured by the terminal, remaining measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value, a cell identifier of a source cell of the inter-system handover, and a cell identifier of a cell meeting a first condition; where the cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level; and in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

In an eleventh aspect, an embodiment of the present application provides a mobility robustness apparatus, including: a second receiving module, configured to receive second measurement information sent by a second network device after a terminal performs intra-system handover; and a second notifying module, configured to notify the terminal to continue measuring a cell signal under a source system of the inter-system handover according to the second measurement information; where the second network device belongs to a target cell of the inter-system handover, and a source cell of the intra-system handover; and the third network device belongs to a target cell of the intra-system handover.

Optionally, after the notifying, by the second notifying module, the terminal to continue measuring the cell signal under the source system of the inter-system handover according to the second measurement information, the second notifying module is further configured to: receive a measurement result sent by the terminal; and in a case that unnecessary HO occurs to the terminal, send the unnecessary HO to a first network device, where the unnecessary HO carries a cell identifier of a cell, meeting a second condition, of the source system.

Optionally, the second measurement information includes part or all a the following: a frequency point needing to be measured by the terminal, remaining measurement time of the terminal, a threshold value of beams, the number of beams greater than the threshold value of the beams needing to be measured, a threshold value of a cell level, a threshold value of beams obtaining cell signal quality and the maximum number of beams exceeding the threshold value, a cell identifier of a source cell of the inter-system handover, and a cell identifier of a cell, meeting a first condition, in cells under the source system; where the cell meeting the first condition is determined by the second network device after receiving first measurement information sent by the first network device, the first measurement information is sent by the first network device after the terminal performs the inter-system handover, and the first network device belongs to the source cell of the inter-system handover.

Optionally, the determining, by the second notifying module, that the unnecessary HO occurs to the terminal includes: in a case that the second measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determining that the unnecessary HO occurs to the terminal; where the second condition includes that the cell signal quality measured within the preset duration is greater than or equal to the threshold value of the cell level; or in a case that the second measurement information includes the threshold value of the beams and the number of the beams greater than the threshold value of the beams needing to be measured by the terminal, and the measured number of the beams greater than the threshold value of the beams in the measurement result is greater than or equal to a preset threshold, determining that the unnecessary HO occurs to the terminal; where the second condition includes that the measured number of the beams greater than the threshold value of the beams is greater than or equal to the preset threshold.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level; and in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

In a twelfth aspect, an embodiment of the present application provides a mobility robustness apparatus, including: a third receiving module, configured to receive a notification, sent by a second network device, of continuing measuring a cell signal under a source system of inter-system handover after performing the inter-system handover; and a measuring module, configured to measure the cell signal under the source system according to the notification sent by the second network device; where the second network device belongs to a target cell of the inter-system handover.

Optionally, the notification sent by the second network device further includes: first measurement information, where the first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value; and the measuring module is configured to send a measurement result to the second network device.

Optionally, after the measuring, by the measuring module, the cell signal under the source system according to the notification sent by the second network device, the measuring module is further configured to: receive, by the terminal, a notification, sent by a third network device, of measuring the cell signal under the source system after performing intra-system handover when measuring the cell signal under the source system; and measure, by the terminal, the cell signal under the source system according to the notification sent by the third network device; where the third network device belongs to a target cell of the intra-system handover.

Optionally, the notification sent by the third network device further includes: second measurement information, where the second measurement information includes part or all of the following: a frequency point needing to be measured by the terminal, remaining measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value, a cell identifier of a source cell of the inter-system handover, and a cell identifier of a cell meeting a first condition; where the cell meeting the first condition is determined by the second network device after receiving first measurement information sent by a first network device, the first measurement information is sent by the first network device after the terminal performs the inter-system handover, and the first network device is a device to which the source cell of the inter-system handover belongs; and the measuring module is configured to send a measurement result to the third network device.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level; and in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

In a thirteenth aspect, another embodiment of the present application further provides a computer storage medium which stores computer-executable instructions. The computer-executable instructions are used to make a computer execute the mobility robustness method according to any one of the embodiments of the present application.

Other features and advantages of the present application will be described in the following description, and will become apparent in part from the description, or will be understood by implementing the present application. The object and other advantages of the present application can be realized and obtained by the structure specially pointed out in the written description, claims and drawings.

BRIEF DESCRIPTION OF THE DRAWINGS

In order to explain technical solutions of embodiments of the present application more clearly, accompanying drawings that need to be used in the embodiments of the present application will be briefly introduced below. Apparently, the drawings introduced below are only some embodiments of the present application, and for those of ordinary skill in the art, on the premise of no creative labor, other drawings can also be obtained according to these drawings.

DETAILED DESCRIPTION OF THE EMBODIMENTS

Part of terms in embodiments of the present application are explained below so as to be understood by those skilled in the art.

1. In the embodiments of the present application, the term "terminal" refers to a communication device that can report channel status information, including a mobile phone, a computer, a tablet, etc.

2. In the embodiments of the present application, the term "network device" refers to a communication device that can receive and decode the channel state information reported by the terminal, including a base station, a macro base station, etc.

In order to clearly understand the technical solutions provided by the embodiments of the present application, a measurement model of an NR system in related art is introduced below.

Figure 1:
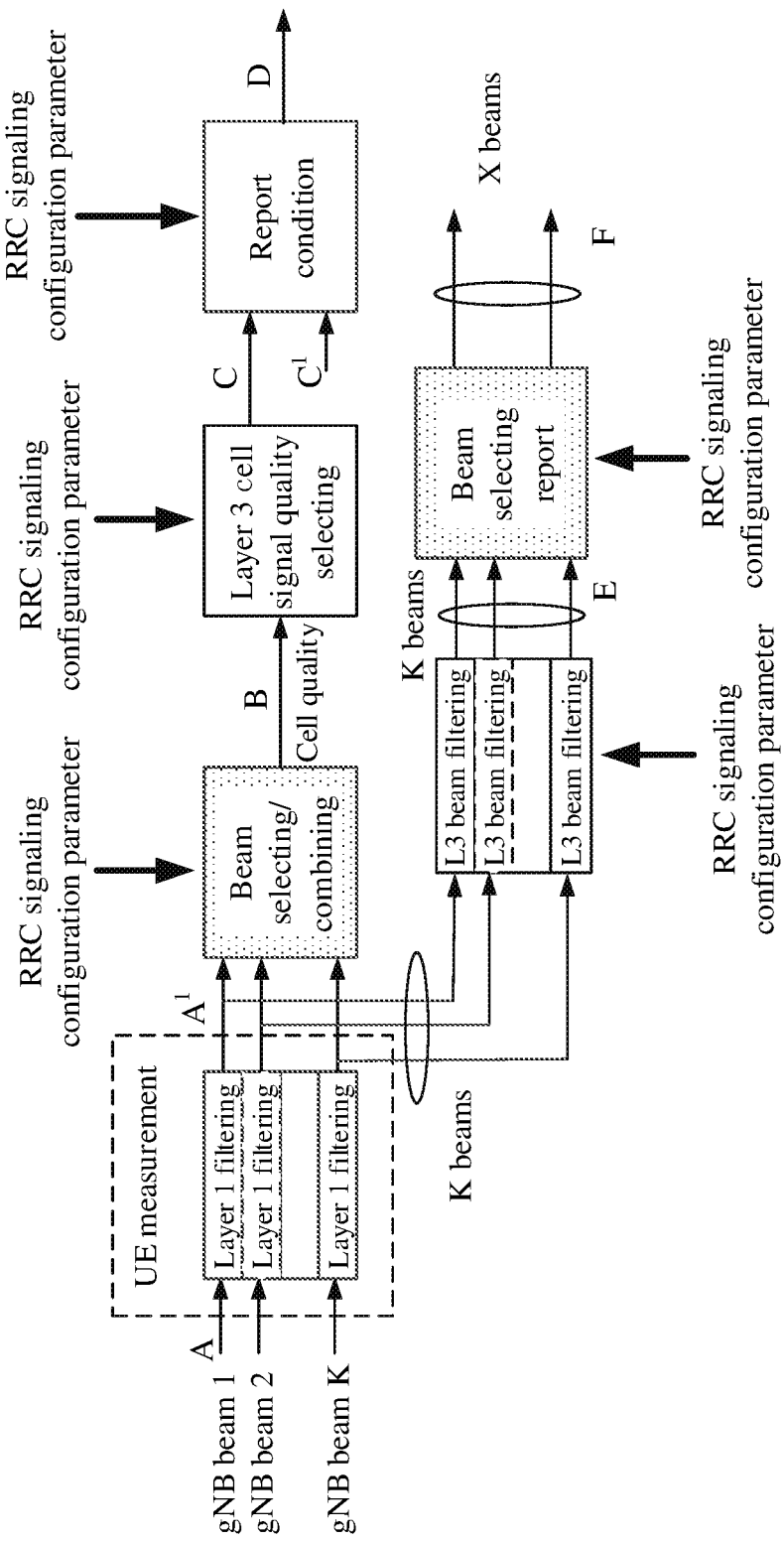
FIG. 1 is a schematic diagram of a measurement model of an NR system in the related art.

FIG. 1 shows a schematic diagram of the measurement model of the NR system in the related art.

In FIG. 1, D represents a measurement result meeting measurement configuration of a cell level. The measurement result of the cell level is a measurement result determined to meet a threshold value after a measurement result A of a beam level is subjected to layer 1 filtering, beam selecting/combining and layer 3 filtering.

F represents a measurement result meeting measurement configuration of a beam level. The measurement result is a measurement result of beams meeting a threshold value of configuration after a measurement result A of the beam level is subjected to layer 1 filtering and then L3 beam filtering.

An embodiment of the present application provides a mobility robustness method, applicable to a scenario of switching from a 5GS to an EPS.

In the method, after a terminal performs inter-system handover to switch from a first network device to a second network device, the first network device determines first measurement information and sends the first measurement information to the second network device. The second network device sends the first measurement information to the terminal. The terminal continues measuring a cell signal under a source system of the inter-system handover according to the first measurement information. The terminal sends a measurement result to the second network device. When determining that unnecessary HO occurs according to the measurement result, the second network device sends the unnecessary HO to the first network device. After intra-system handover occurs to the terminal during measurement of the cell signal of the source system and thus the terminal is switched from the second network device to a third network device, the second network device determines second measurement information and sends the second measurement information to the third network device. The third network device sends the second measurement information to the terminal, so that the terminal continues measuring the cell signal under the source system of the inter-system handover. The terminal sends a measurement result to the third network device. When determining that unnecessary HO occurs according to the measurement result, the third network device sends the unnecessary HO to the first network device.

In the above method, when the terminal is switched from the 5GS to the EPS, the terminal can continue measuring a cell signal of a source cell of the 5GS to determine whether the unnecessary HO occurs. In addition, when the terminal is switched from a cell of the EPS to a cell of another EPS during measurement of the cell signal of the source cell, the terminal can also continue measuring the cell signal of the 5GS to determine whether the unnecessary HO occurs to the terminal.

In the embodiments of the present application, the terminal is a device having a wireless communication function, may be deployed on the land, including being deployed indoors or outdoors, and being handheld or vehicle-mounted, may also be deployed on water surfaces (e.g., ships), and may be further deployed in the air (e.g., airplanes, balloons and satellites). The terminal may be a mobile phone, a pad, a computer with a wireless receiving and sending function, a virtual reality (VR) terminal, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, and a wireless terminal in a smart home. The terminal may also be various forms of user equipment (UE), mobile stations (MS) and terminal devices.

The first network device, the second network device and the third network device are devices providing a wireless communication function for the terminal, including but not limited to: a gNB in 5G, a radio network controller (RNC), a node B (NB), a base station controller (BSC), a base transceiver station (BTS), a home base station (e.g., a home evolved node B or a home node B (HNB)), a baseband unit (BBU), a transmitting and receiving point (TRP), a transmitting point (TP), a mobile switching center and the like. The base station in the present application may further be a device providing the wireless communication function for the terminal in other communication systems that may appear in the future.

In order to make the objects, technical solutions and advantages of the present application clearer, the present application will be further described in detail in combination with the attached drawings below. Apparently, the described embodiments are only part of the embodiments of the present application, not all of them. Based on the embodiments in the present application, all other embodiments obtained by those ordinarily skilled in the art without making creative work belong to the protection scope of the present application.

Figure 2:
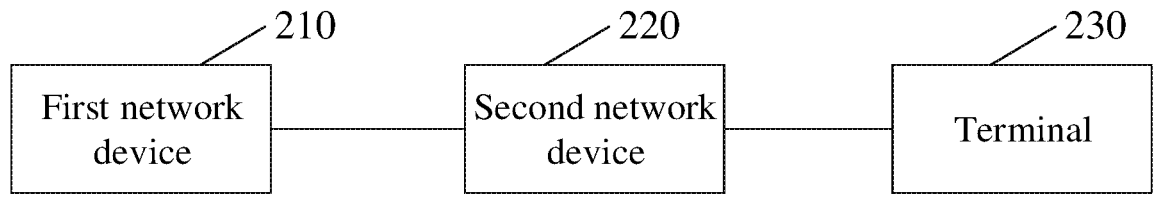
FIG. 2 is one of schematic structural diagrams of a mobility robustness system in an embodiment of the present application.

An embodiment of the present application provides a mobility robustness system. Referring to FIG. 2, it is a schematic structural diagram of the mobility robustness system in the embodiments of the present application. The system includes a first network device 210, a second network device 220 and a terminal 230.

The first network device 210 is configured to determine first measurement information after a terminal performs inter-system handover, and send the determined first measurement information to a second network device.

During implementation, the first network device may be a device of the 5GS.

The second network device 220 is configured to receive the first measurement information sent by the first network device after the terminal performs the inter-system handover, and notify the terminal to continue measuring a cell signal under a source system of the inter-system handover according to the first measurement information.

During implementation, the second network device may be a device of the EPS.

The terminal 230 is configured to receive the notification, sent by the second network device, of continuing measuring the cell signal under the source system of the inter-system handover after performing the inter-system handover, and measure the cell signal under the source system according to the notification sent by the second network device.

The terminal 230 is further configured to send a measurement result of a cell under the source system to the second network device.

The second network device 220 is further configured to receive the measurement result sent by the terminal, and send unnecessary HO to the first network device when determining that the unnecessary HO occurs during the inter-system handover of the terminal.

The first network device 210 is further configured to receive the unnecessary HO sent by the second network device.

In the above system, after performing the inter-system handover, the terminal continues measuring the cell signal under the source system according to the measurement information determined by the first network device, thereby determining whether the unnecessary HO occurs. The terminal notifies the network device of the source cell when the unnecessary HO occurs to the terminal.

In a possible implementation, the first measurement information includes part or all of the following: a frequency point needing to be measured by the terminal, measurement time of the terminal, a threshold value of beams, the number of beams greater than a threshold value of beams needing to be measured by the terminal, a threshold value of a cell level, a threshold value of beams obtaining cell signal quality and the maximum number of beams exceeding the threshold value.

The technical solution provided by the embodiment of the present application is further explained below according to contents of the first measurement information.

1. The first measurement information includes the frequency point needing to be measured by the terminal, the measurement time of the terminal, the threshold value of the beams and the number of the beams greater than the threshold value of the beams needing to be measured by the terminal.

For example, the first network device is a device of the 5GS, and the second network device is a device of the EPS. After the terminal is switched from the first network device to the second network device, the first network device determines the first measurement information including: the frequency point freq1 needing to be measured by the terminal, the measurement time 15 s of the terminal, the threshold value A1 of the beams and the number of the beams greater than the threshold value A1 of the beams needing to be measured by the terminal. The first network device sends the first measurement information to the second network device.

The second network device performs measurement configuration for the terminal according to the first measurement information. It is configured that the measurement frequency point of the terminal is freq1, the measurement time is 15 s, and the threshold value of the beams is A1. The terminal measures a cell signal of a cell with a frequency point being freq1 and the number of the beams greater than A1 under the 5GS according to the configuration from the second network device. The measurement time of the terminal is 15 s.

The terminal sends a measurement result to the second network device after measurement. The second network device determines whether the measurement result sent by the terminal meets a first condition.

Optionally, the first condition is that the measured number of the beams greater than the threshold value of the beams is greater than or equal to a preset threshold. During implementation, the preset threshold may be set by oneself, which is not specifically limited by the present application. For example, the preset threshold may be set as 10, 15 and the like.

The measurement result, sent by the terminal, received by the second network device is that in a measurement result of cell1 under the frequency point freq1, the number of the beams greater than A1 is 20, which is greater than the preset threshold 15. In a measurement result of cell2 under the frequency point freq1, the number of the beams greater than A1 is 15, which is equal to the preset threshold 15. Therefore, the second network device determines that the unnecessary HO occurs when the terminal performs the inter-system handover.

After determining that the unnecessary HO occurs to the terminal, the second network device sends the unnecessary HO to the first network device. The unnecessary HO carries identifiers of cell1 and cell2.

2. The first measurement information includes the frequency point needing to be measured by the terminal, the measurement time of the terminal, the threshold value of the cell level, the threshold value of the beams obtaining the cell signal quality and the maximum number of the beams exceeding the threshold value.

For example, the first network device is a device of the 5GS, and the second network device is a device of the EPS. After the terminal is switched from the first network device to the second network device, the first network device determines the first measurement information including: the frequency point freq2 needing to be measured by the terminal, the measurement time 18 s of the terminal, the threshold value B1 of the cell level, the threshold value B2 of the beams obtaining the cell signal quality and the number of the beams greater than B2 needing to be measured by the terminal. The first network device sends the first measurement information to the second network device.

The second network device performs measurement configuration for the terminal according to the first measurement information. It is configured that the measurement frequency point of the terminal is freq2, the measurement time is 18 s, the threshold value of the cell level is B1, and the threshold value of the beams obtaining the cell quality is B2. The terminal measures a cell signal of a cell with a frequency point being freq2 and the number of the beams greater than B2 under the 5GS according to the configuration from the second network device. The measurement time of the terminal is 18 s.

The terminal sends a measurement result to the second network device after measurement. The second network device determines whether the measurement result sent by the terminal meets the first condition.

Optionally, the cell signal quality measured within a preset duration is greater than or equal to the threshold value of the cell level. During implementation, the preset duration may be set by oneself, which is not specifically limited by the present application. For example, the preset duration may be set as 3 s, 4 s and the like.

For example, the measurement result, sent by the terminal, received by the second network device is that in a measurement result of cell3 under the frequency point freq2, the number of the beams greater than B2 within in 3 s is 20. The second network device obtains the cell signal quality according to the 20 beams greater than B2. If the obtained cell signal quality is greater than the threshold value B1 of the cell level, the second network device determines that the unnecessary HO occurs when the terminal performs the inter-system handover.

Alternatively, the second network device may select the specified number of beams from the 20 beams greater than B2, e.g., 10 or 15 beams. Taking 10 beams as an example, the second network device selects 10 beams greater than B2 to determine the cell signal quality. If the determined cell signal quality is greater than B1, the second network device determines that the unnecessary HO occurs to the terminal.

After determining that the unnecessary HO occurs to the terminal, the second network device sends the unnecessary HO to the first network device. The unnecessary HO carries an identifier of cell3.

In the embodiments of the present application, the terminal measures the cell signal quality under the source system within the measurement time determined by the first network device. If the intra-system handover occurs to the terminal within the measurement time, the terminal further needs to continue measuring the cell signal quality under the source system of the inter-system handover.

Figure 3:
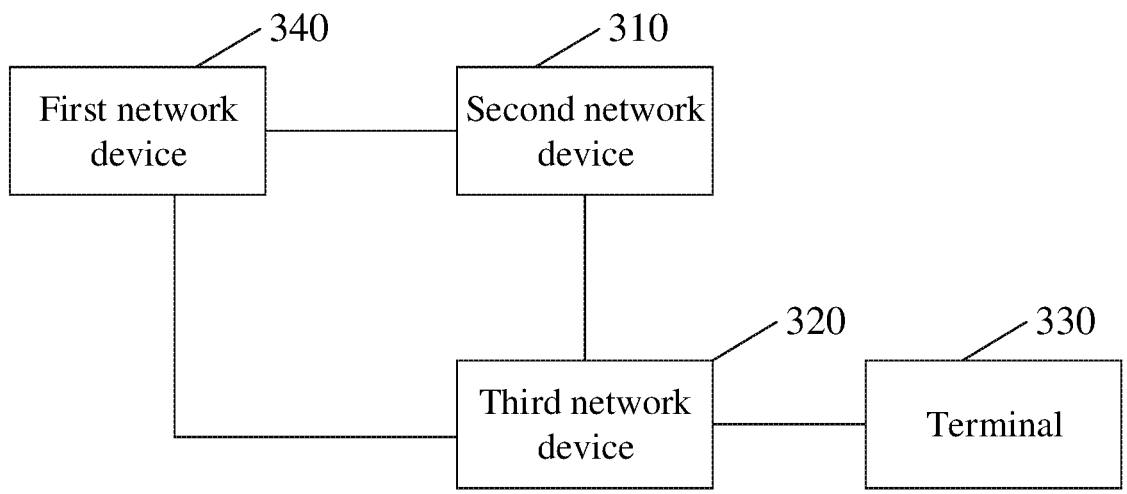
FIG. 3 is one of schematic structural diagrams of a mobility robustness system in an embodiment of the present application.

Referring to FIG. 3, it is a mobility robustness system in an embodiment of the present application. The system includes a second network device 310, a third network device 320, a terminal 330 and a fourth network device 340.

The second network device 310 is configured to determine second measurement information after a terminal performs intra-system handover, and send the determined second measurement information to a third network device.

The third network device 320 is configured to receive the second measurement information sent by the second network device after the terminal performs the intra-system handover, and notify the terminal to continue measuring a cell signal under a source system of the inter-system handover according to the second measurement information.

The terminal 330 is configured to measure the cell signal under the source system according to the notification sent by the third network device.

The terminal 330 is further configured to send a measurement result of a cell under the source system to the third network device.

The third network device 320 is further configured to receive the measurement result sent by the terminal, and send unnecessary HO to a first network device when determining that the unnecessary inter-system HO occurs to the terminal.

The first network device 340 is configured to receive the unnecessary HO sent by the third network device. The unnecessary HO carries a cell identifier meeting a first condition and a second condition.

During implementation, the first network device is a device to which a source cell of the inter-system handover belongs; the second network device is a device to which a target cell of the inter-system handover belongs, and is a device to which a source cell of the intra-system handover belongs; and the third network device is a device to which the target cell of the intra-system handover belongs.

In one possible embodiment, the second measurement information includes part or all of the following: a frequency point needing to be measured by the terminal, remaining measurement time of the terminal, a threshold value of beams, the number of beams greater than a threshold value of beams needing to be measured by the terminal, a threshold value of a cell level, a threshold value of beams obtaining cell signal quality, the maximum number of beams exceeding the threshold value, a cell identifier of the source cell of the inter-system handover, and a cell identifier of a cell meeting the first condition.

The cell meeting the first condition is determined by the second network device after receiving first measurement information sent by the first network device, the first measurement information is sent by the first network device after the terminal performs the inter-system handover, and the first network device is a device to which the source cell of the inter-system handover belongs.

The terminal sends the measurement result to the third network device.

The technical solution provided by the embodiment of the present application is further explained below according to the second measurement information.

1. The second measurement information includes the frequency point needing to be measured by the terminal, the remaining measurement time of the terminal, the threshold value of the beams, the number of the beams greater than the threshold value of the beams needing to be measured by the terminal and the cell identifier of the cell meeting the first condition.

For example, the first network device belongs to the 5GS, and the second network device and the third network device belong to the EPS. After being switched from the first network device to the second network device, the terminal measures a cell signal under the 5GS. The terminal sends a measurement result to the second network device, and the second network device determines that unnecessary HO occurs to the terminal and sends the unnecessary HO, carrying an identifier of cell1 meeting the first condition, to the first network device.

The intra-system handover occurs to the terminal during measurement of the cell signal under the 5GS. For example, during switching from the second network device to the third network device, the second network device determines the second measurement information. The second measurement information includes the frequency point needing to be measured by the terminal, the remaining measurement time of the terminal, the threshold value of the beams, the number of the beams greater than the threshold value of the beams needing to be measured by the terminal and the cell identifier of cell1 meeting the first condition.

The second network device sends the second measurement information to the third network device. The third network device performs measurement configuration for the terminal according to the second measurement information. The third network device configures that the measurement frequency point of the terminal is freq1, the remaining measurement time is 8 s, and the threshold value of the beams is A1.

The terminal measures a cell of the source system of the inter-system handover according to the configuration from the third network device and sends a measurement result to the third network device.

In the measurement result, sent by the terminal, received by the third network device, in a measurement result of cell3 under the frequency point freq1, the number of the beams greater than A1 is 12, and in a measurement result of cell4, the number of the beams greater than A1 is 14. The third network device determines whether the measurement results of cell3 and cell4 meet the second condition.

Optionally, the second condition may be that the measured number of the beams greater than the threshold value of the beams is greater than or equal to a preset threshold. During implementation, the preset threshold may be set by oneself, which is not specifically limited by the present application. For example, the preset threshold may be set as 10, 15 and the like.

The third network device determines that in the measurement result of cell3, the number of the beams greater than A1 is greater than the preset threshold 10, thereby determining that the unnecessary HO occurs when the terminal executes the inter-system handover.

The third network device obtains history information of the terminal to determine a cell, under the 5GS, where the inter-system handover occurs the last time, namely the first network device. The third network device sends the unnecessary HO to the first network device. The unnecessary HO carries identifiers of cell1 and cell3.

2. The second measurement information includes the frequency point needing to be measured by the terminal, the remaining measurement time of the terminal, the threshold value of the beams, the number of the beams greater than the threshold value of the beams needing to be measured by the terminal, the cell identifier of the cell meeting the first condition and the cell identifier of the source cell of the inter-system handover.

For example, the first network device belongs to the 5GS, and the second network device and the third network device belong to the EPS. After being switched from the first network device to the second network device, the terminal measures a cell signal under the 5GS. The terminal sends a measurement result to the second network device, and the second network device determines that the unnecessary HO occurs to the terminal and sends the unnecessary HO, carrying the identifier of cell1 meeting the first condition, to the first network device.

The intra-system handover occurs to the terminal during measurement of the cell signal under the 5GS. For example, during switching from the second network device to the third network device, the second network device determines the second measurement information. The second measurement information includes the frequency point needing to be measured by the terminal, the remaining measurement time of the terminal, the threshold value of the beams, the number of the beams greater than the threshold value of the beams needing to be measured by the terminal, the identifier of cell1 meeting the first condition, and an identifier of the first network device.

The second network device sends the second measurement information to the third network device. The third network device performs measurement configuration for the terminal according to the second measurement information. The third network device configures that the measurement frequency point of the terminal is freq1, the remaining measurement time is 8 s, and the threshold value of the beams is A1.

The terminal measures a cell of the source system of the inter-system handover according to the configuration from the third network device and sends a measurement result to the third network device.

In the measurement result, sent by the terminal, received by the third network device, in a measurement result of cell3 under the frequency point freq1, the number of the beams greater than A1 is 12, and in a measurement result of cell4, the number of the beams greater than A1 is 14. The third network device determines whether the measurement results of cell3 and cell4 meet the second condition.

Optionally, the second condition may be that the measured number of the beams greater than the threshold value of the beams is greater than or equal to a preset threshold. During implementation, the preset threshold may be set by oneself, which is not specifically limited by the present application. For example, the preset threshold may be set as 10, 15 and the like.

The third network device determines that in the measurement result of cell3, the number of the beams greater than A1 is greater than the preset threshold 10, thereby determining that the unnecessary HO occurs when the terminal executes the inter-system handover.

The third network device sends the unnecessary HO to the first network device. The unnecessary HO carries the identifiers of cell1 and cell3.

3. The second measurement information includes the frequency point needing to be measured by the terminal, the remaining measurement time of the terminal, the threshold value of the cell level, the threshold value of the beams obtaining the cell signal quality, the maximum number of the beams exceeding the threshold value and the cell identifier of the cell meeting the first condition.

For example, the first network device belongs to the 5GS, and the second network device and the third network device belong to the EPS. After being switched from the first network device to the second network device, the terminal measures a cell signal under the 5GS. The terminal sends a measurement result to the second network device, and the second network device determines that the unnecessary HO occurs to the terminal and sends the unnecessary HO to the first network device, where the unnecessary HO carries the identifier of cell1 meeting the first condition.

The intra-system handover occurs to the terminal during measurement of the cell signal under the 5GS. For example, during switching from the second network device to the third network device, the second network device determines the second measurement information including: the frequency point needing to be measured by the terminal, the remaining measurement time of the terminal, the threshold value of the cell level, the threshold value of the beams obtaining the cell signal quality, the maximum number of the beams exceeding the threshold value and the cell identifier of the cell meeting the first condition.

The second network device sends the second measurement information to the third network device. The third network device performs measurement configuration for the terminal according to the second measurement information. The third network device configures that the measurement frequency point of the terminal is freq2, the remaining measurement time is 10 s, the threshold value of the cell level is B1 and the threshold value of the beams obtaining the cell quality is B2.

The terminal measures the cell of the source system of the inter-system handover according to the configuration from the third network device and sends a measurement result to the third network device.

In the measurement result, sent by the terminal, received by the third network device, in a measurement result of cell3 under the frequency point freq2, the number of the beams greater than B2 within a preset duration is 12, and in a measurement result of cell4, the number of the beams greater than B2 within the preset duration is 14. The third network device obtains that the cell quality of cell3 is C1 according to the 12 beams greater than B2, and obtains that the cell quality of cell4 is C2 according to the 14 beams greater than B2.

During implementation, the preset duration may be set by oneself, e.g., 2 s, 3 s and the like, which is not specifically limited by the present application. Optionally, the third network device may select the specified number of beams from the beams greater than B2 to obtain the cell signal quality. For example, the specified number may be 10, 8 and the like. For example, the third network device selects 8 beams from the 12 beams greater than B2 in the measurement result of cell3 to obtain that the signal quality of cell3 is C1, and selects 8 beams from the 14 beams greater than B2 in the measurement result of cell4 to obtain that the signal quality of cell4 is C2.

The third network device determines that the signal quality C1 of cell3 is greater than the threshold value B1 of the cell level, and the signal quality C2 of cell4 is greater than the threshold value B2 of the cell level. Therefore, it is determined that the unnecessary HO occurs when the terminal executes the inter-system handover.

The third network device obtains history information of the terminal to determine a cell, under the 5GS, where the inter-system handover occurs the last time, namely the first network device. The third network device sends the unnecessary HO to the first network device. The unnecessary HO carries the identifiers of cell1, cell3 and cell4.

4. The second measurement information includes the frequency point needing to be measured by the terminal, the remaining measurement time of the terminal, the threshold value of the cell level, the threshold value of the beams obtaining the cell signal quality, the maximum number of the beams exceeding the threshold value, the cell identifier of the cell meeting the first condition and the cell identifier of the source cell of the inter-system handover.

For example, the first network device belongs to the 5GS, and the second network device and the third network device belong to the EPS. After being switched from the first network device to the second network device, the terminal measures a cell signal under the 5GS. The terminal sends a measurement result to the second network device, and the second network device determines that the unnecessary HO occurs to the terminal and sends the unnecessary HO, carrying the identifier of cell1 meeting the first condition, to the first network device.

The intra-system handover occurs to the terminal during measurement of the cell signal under the 5GS. For example, during switching from the second network device to the third network device, the second network device determines the second measurement information including: the frequency point needing to be measured by the terminal, the remaining measurement time of the terminal, the threshold value of the cell level, the threshold value of the beams obtaining the cell signal quality, the maximum number of the beams exceeding the threshold value and the cell identifier of the cell meeting the first condition.

The second network device sends the second measurement information to the third network device. The third network device performs measurement configuration for the terminal according to the second measurement information. The third network device configures that the measurement frequency point of the terminal is freq2, the remaining measurement time is 10 s, the threshold value of the cell level is B1 and the threshold value of the beams obtaining the cell quality is B2.

The terminal measures the cell of the source system of the inter-system handover according to the configuration from the third network device and sends a measurement result to the third network device.

In the measurement result, sent by the terminal, received by the third network device, in a measurement result of cell3 under the frequency point freq2, the number of the beams greater than B2 within a preset duration is 12, and in a measurement result of cell4, the number of the beams greater than B2 within the preset duration is 14. The third network device obtains that the cell quality of cell3 is C1 according to the 12 beams greater than B2, and obtains that the cell quality of cell4 is C2 according to the 14 beams greater than B2.

During implementation, the preset duration may be set by oneself, e.g., 2 s, 3 s and the like, which is not specifically limited by the present application. Optionally, the third network device may select the specified number of beams from the beams greater than B2 to obtain the cell signal quality. For example, the specified number may be 10, 8 and the like. For example, the third network device selects 8 beams from the 12 beams greater than B2 in the measurement result of cell3 to obtain that the signal quality of cell3 is C1, and selects 8 beams from the 14 beams greater than B2 in the measurement result of cell4 to obtain that the signal quality of cell4 is C2.

The third network device determines that the signal quality C1 of cell3 is greater than the threshold value B1 of the cell level, and the signal quality C2 of cell4 is greater than the threshold value B2 of the cell level. Therefore, it is determined that the unnecessary HO occurs when the terminal executes the inter-system handover.

The third network device sends the unnecessary HO to the device corresponding to the identifier of the source cell of the inter-system handover, namely the first network device. The unnecessary HO carries the identifiers of cell1, cell3 and cell4.

The technical solution provided by the present application is further explained below through specific embodiments.

Embodiment 1 gNB1 is a device under a 5GS, and eNB1 is a device under an EPS. CELL 1, CELL A and CELL B are cells under the 5GS, and CELL 2 is a cell under the EPS.

Figure 4:
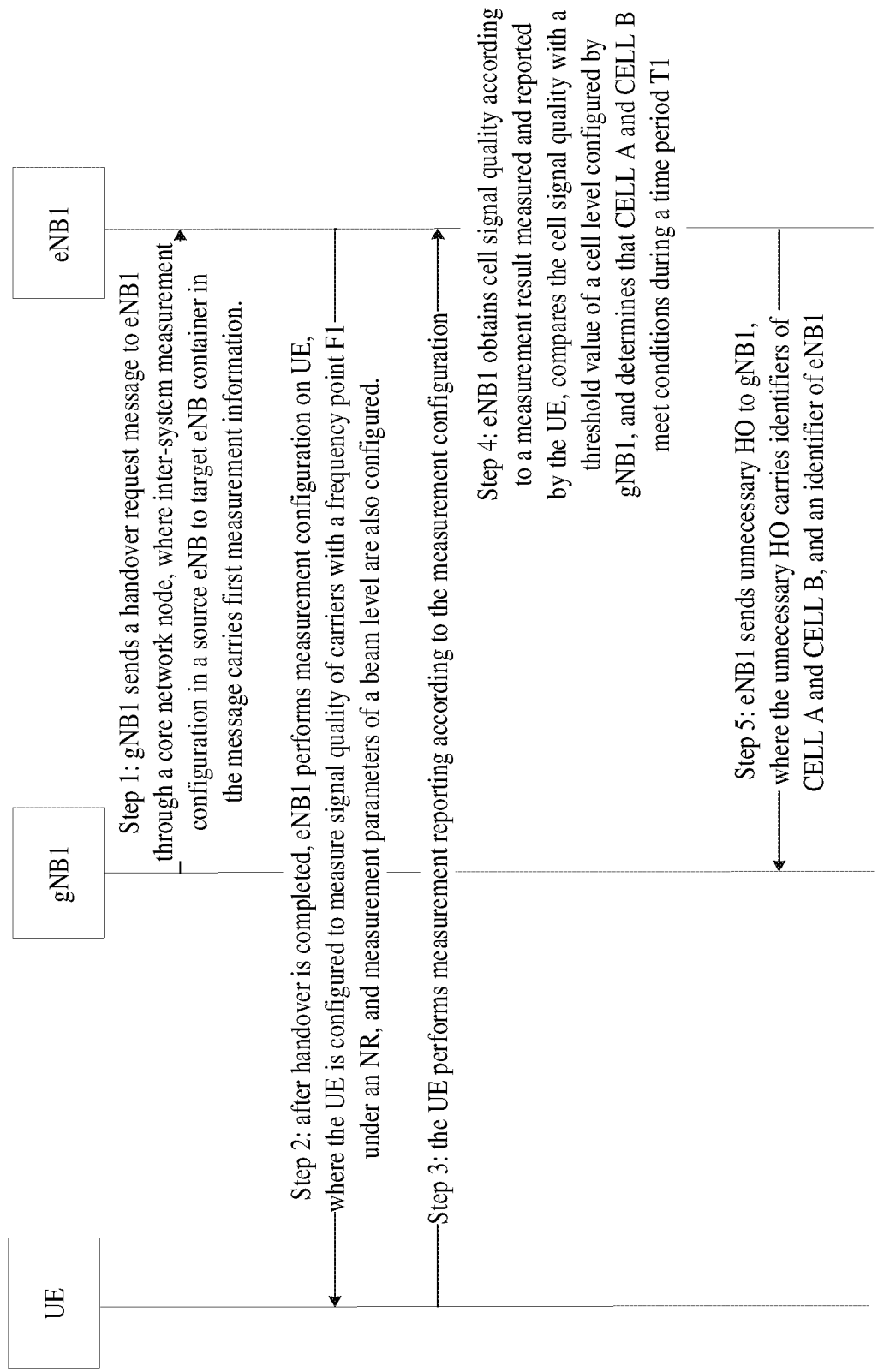
FIG. 4 is one of flow diagrams of a mobility robustness method in an embodiment of the present application.

Referring to FIG. 4, it is a flow diagram of a mobility robustness method in the embodiment of the present application. The method may include the following steps.

UE is switched from CELL 1 under the 5GS to CELL 2 under the EPS.

Step 1: gNB1 sends a handover request message to eNB1 through a core network node. Inter-system measurement configuration in a source eNB to target eNB container in the message carries first measurement information.

The first measurement information includes: measurement time T1, a frequency point F1 of an NR needing to be measured by a terminal, a threshold value of L3-reference signal receiving power (RSRP) (i.e., a threshold value of a cell level), a threshold value of beams obtaining cell signal quality and the maximum number of beams exceeding the threshold value.

Step 2: after handover is completed, eNB1 performs measurement configuration on the UE, where the UE is configured to measure signal quality of carriers with a frequency point F1 under the NR, and measurement parameters of a beam level are also configured.

During implementation, the measurement parameters of the beam level are, for example, the threshold value of the beams obtaining the cell signal quality.

Step 3: the UE performs measurement reporting according to the measurement configuration.

Step 4: eNB1 obtains the cell signal quality according to a measurement result measured and reported by the UE and compares the cell signal quality with the threshold value of the cell level configured by gNB1, and determines that CELL A and CELL B meet conditions during a time period T1.

Step 5: eNB1 sends unnecessary HO to gNB1, where the unnecessary HO carries identifiers of CELL A and CELL B and an identifier of eNB1.

Embodiment 2 gNB1 is a device under the 5GS, and eNB1 and eNB2 are devices under the EPS. CELL 1, CELL A, CELL B, CELL C and CELL D are cells under the 5GS, and CELL 2 is a cell under the EPS.

Figure 5:
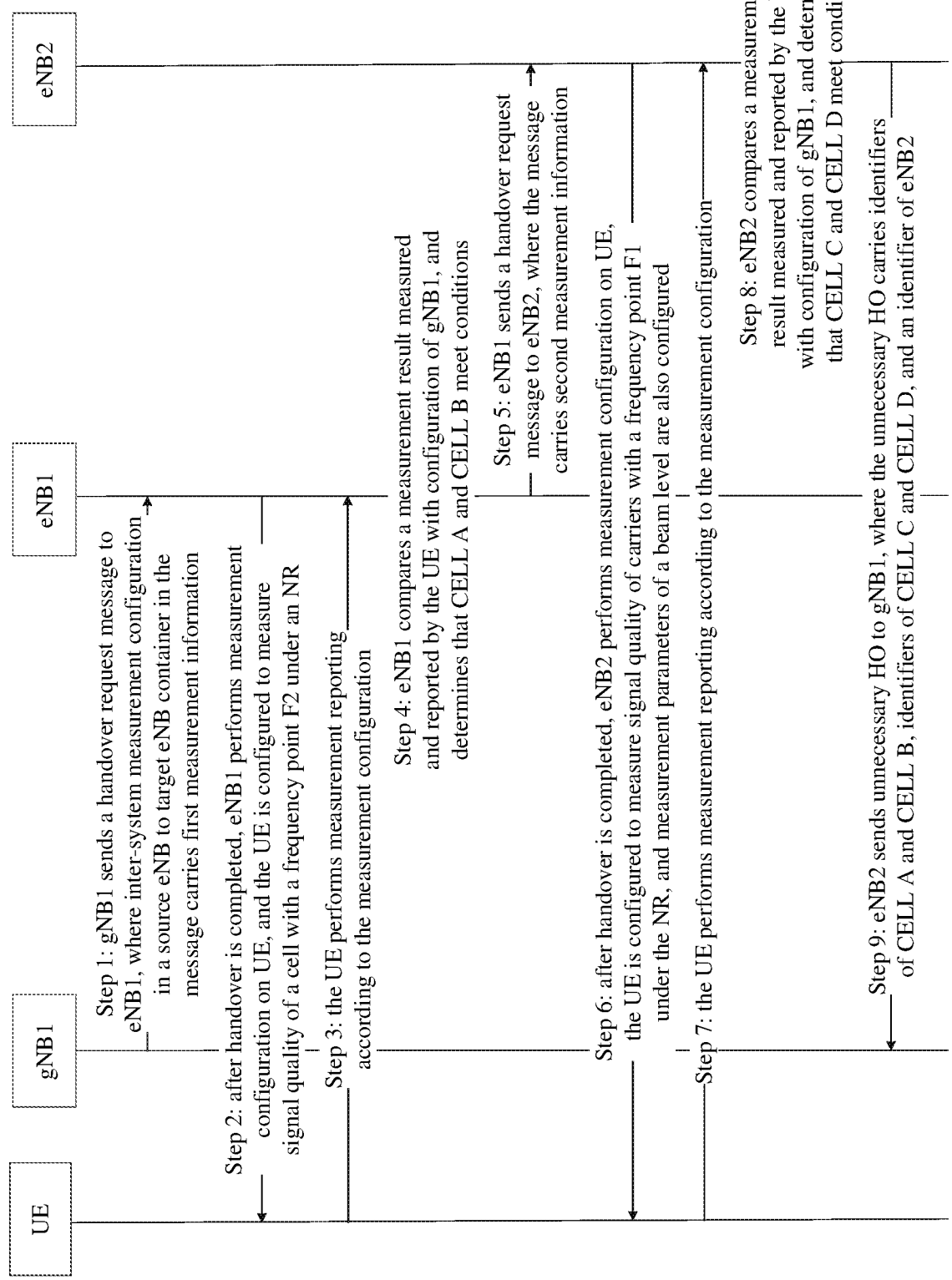
FIG. 5 is one of flow diagrams of a mobility robustness method in an embodiment of the present application.

Referring to FIG. 5, it is a flow diagram of a mobility robustness method in the embodiment of the present application. The method may include the following steps.

UE is switched from CELL 1 under the 5GS to CELL 2 under the EPS.

Step 1: gNB1 sends a handover request message to eNB1. Inter-system measurement configuration in a source eNB to target eNB container in the message carries first measurement information.

The first measurement information includes: measurement time T1, a frequency point F2 of an NR needing to be measured by a terminal, a max number of beams for cell level measurement, beam RSRP for cell level measurement report, a threshold value of L3-RSRP, a threshold value of beams obtaining cell signal quality and the maximum number of beams exceeding the threshold value.

Step 2: after handover is completed, eNB1 performs measurement configuration on the UE, and the UE is configured to measure signal quality of a cell with a frequency point F2 under the NR.

Step 3: the UE performs measurement reporting according to the measurement configuration.

Step 4: eNB1 compares a measurement result measured and reported by the UE with configuration of gNB1, and determines that CELL A and CELL B meet conditions.

During implementation, eNB1 determines that in a measurement result of CELL A, the max number of beams for cell level measurement is greater than a preset threshold 10, and in a measurement result of CELL B, the obtained signal quality of CELL B is greater than a threshold value of L3-RSRP.

After the UE is switched to the current cell, intra-EPS or inter-eNB handover occurs quickly, and a target cell is CELL 3.

Step 5: eNB1 sends a handover request message to eNB2. The message carries second measurement information.

The second measurement information includes: remaining measurement time T2, a frequency point F1 of the NR needing to be measured by the terminal, the max number of beams for cell level measurement, beam RSRP for cell level measurement report, a threshold value of L3-RSRP, a threshold value of beams obtaining cell signal quality, the maximum number of beams exceeding the threshold value, and identifiers of CELL A, CELL B and CELL 1, measured by the UE in the source cell, meeting a specified measurement threshold.

Step 6: after handover is completed, eNB2 performs measurement configuration on the UE, the UE is configured to measure signal quality of carriers with a frequency point F1 under the NR, and measurement parameters of a beam level are also configured.

During implementation, the parameters of the beam level are, for example, the threshold value of the beams obtaining the cell signal quality, or the beam RSRP for cell level measurement report, or the like.

Step 7: the UE performs measurement reporting according to the measurement configuration.

Step 8: eNB2 compares a measurement result measured and reported by the UE with configuration of gNB1, and determines that CELL C and CELL D meet conditions.

During implementation, within time T2, according to the threshold value of the beams obtaining the cell signal quality and the maximum number of the beams exceeding the threshold value in a measurement result of CELL C, eNB2 obtains that cell quality of CELL C is Q1. According to the measurement result of CELL C, cell quality of CELL D is obtained as Q2, which is greater than the threshold value of L3-RSRP.

In addition, eNB2 determines that in measurement results of CELL C and CELL D, the max number of beams for cell level measurement is greater than a preset threshold 8.

Step 9: eNB2 sends unnecessary HO to gNB1, where the unnecessary HO carries identifiers of CELL A and CELL B, identifiers of CELL C and CELL D and an identifier of eNB 2.

Figure 6:
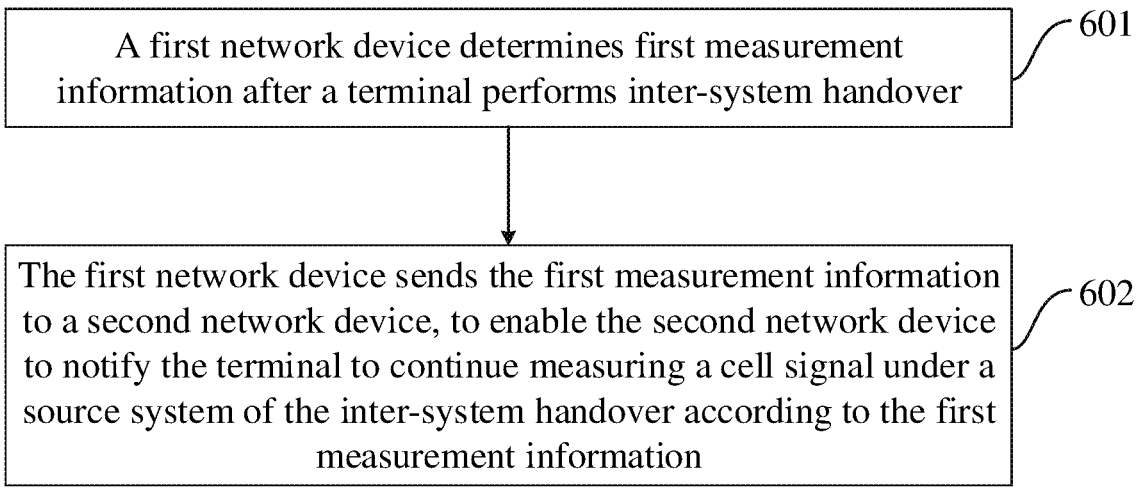
FIG. 6 is one of flow diagrams of a mobility robustness method in an embodiment of the present application.

Based on the same inventive concept, an embodiment of the present application provides a mobility robustness method. Referring to FIG. 6, it is a flow diagram of the mobility robustness method in the embodiment of the present application. The method includes the following steps.

Step 601: a first network device determines first measurement information after a terminal performs inter-system handover.

Step 602: the first network device sends the determined first measurement information to a second network device to enable the second network device to notify the terminal to continue measuring a cell signal under a source system of the inter-system handover according to the first measurement information.

The first network device belongs to a source cell of the inter-system handover, and the second network device belongs to a target cell of the inter-system handover.

Optionally, after the first network device sends the determined first measurement information to the second network device, the method further includes: in a case that the first network device receives unnecessary HO sent by the second network device, determining that the unnecessary HO occurs when the terminal performs the inter-system handover. The unnecessary HO carries a cell identifier of a cell, meeting a first condition, in cells under the source system.

Optionally, the first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level.

in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Optionally, after the first network device sends the determined first measurement information to the second network device, the method further includes: in a case that the first network device receives unnecessary HO sent by a third network device, determining that the unnecessary HO occurs when the terminal performs the inter-system handover. The unnecessary HO carries a cell identifier of a cell, meeting a second condition, in cells under the source system.

The cell meeting the second condition is determined by the third network device after receiving second measurement information sent by the second network device, the second measurement information is sent by the second network device after the intra-system handover is performed within measurement time of the terminal measuring the cell signal under the source system, and the third network device belongs to a target cell of the intra-system handover.

Optionally, in a case that the second measurement information includes a threshold value of a cell level, a threshold value of beams obtaining cell signal quality and the maximum number of beams exceeding the threshold value, the second condition includes that cell signal quality measured within a preset duration is greater than or equal to the threshold value of the cell level.

In a case that the second measurement information includes the threshold value of the beams and the number of the beams greater than the threshold value of the beams needing to be measured by the terminal, the second condition includes that the measured number of the beams greater than the threshold value of the beams is greater than or equal to a preset threshold.

Figure 7:
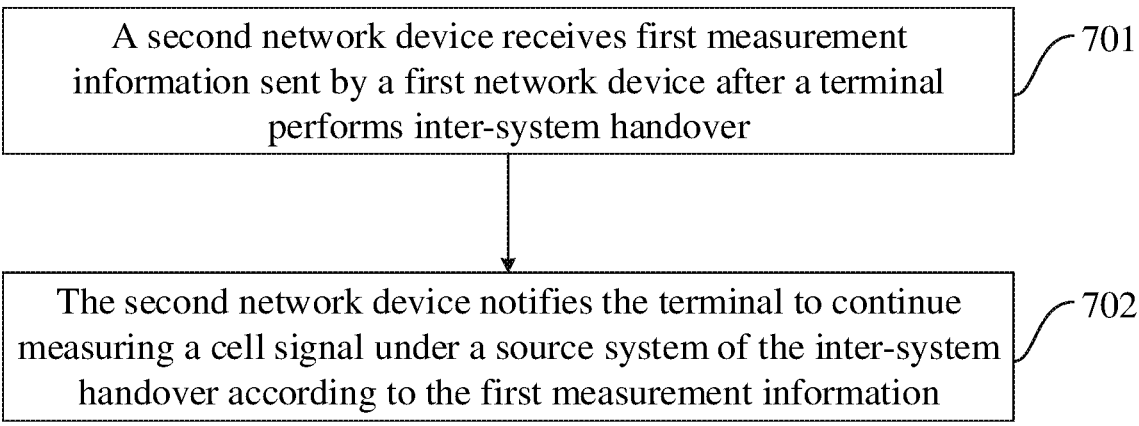
FIG. 7 is one of flow diagrams of a mobility robustness method in an embodiment of the present application.

Based on the same inventive concept, an embodiment of the present application provides another mobility robustness method. Referring to FIG. 7, it is a flow diagram of the mobility robustness method in the embodiment of the present application. The method includes the following steps.

Step 701: a second network device receives first measurement information sent by a first network device after a terminal performs inter-system handover.

Step 702: the second network device notifies the terminal to continue measuring a cell signal under a source system of the inter-system handover according to the first measurement information.

The first network device belongs to a source cell of the inter-system handover, and the second network device belongs to a target cell of the inter-system handover.

Optionally, after the second network device notifies the terminal to continue measuring the cell signal under the source system of the inter-system handover according to the first measurement information, the method further includes: receiving a measurement result sent by the terminal; and in a case that unnecessary HO occurs to the terminal, sending the unnecessary HO to the first network device. The unnecessary HO carries a cell identifier of a cell, meeting a first condition, in cells under the source system.

Optionally, the first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

Optionally, determining that the unnecessary HO occurs to the terminal includes: in a case that the first measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determining that the unnecessary HO occurs to the terminal; where the first condition includes that the cell signal quality measured within the preset duration is greater than or equal to the threshold value of the cell level; or in a case that the first measurement information includes the threshold value of the beams and the number of the beams greater than the threshold value of the beams needing to be measured by the terminal, and the measured number of the beams greater than the threshold value of the beams in the measurement result is greater than or equal to a preset threshold, determining that the unnecessary HO occurs to the terminal; where the first condition includes that the measured number of the beams greater than the threshold value of the beams is greater than or equal to the preset threshold.

Optionally, after the second network device notifies the terminal to continue measuring the cell signal under the source system of the inter-system handover according to the first measurement information, the method further includes: determining, by the second network device, second measurement information after the terminal performs intra-system handover; and sending, by the second network device, the determined second measurement information to a third network device to enable the third network device to notify the terminal to continue measuring the cell signal under the source system of the inter-system handover according to the second measurement information.

The third network device belongs to a target cell of the intra-system handover.

Optionally, the second measurement information includes part or all of the following: a frequency point needing to be measured by the terminal, remaining measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value, a cell identifier of the source cell of the inter-system handover, and a cell identifier of a cell meeting the first condition.

The cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, in a case that the first measurement information includes the threshold value of the cell level, the threshold value of the beams obtaining the cell signal quality and the maximum number of the beams exceeding the threshold value, the first condition includes that cell signal quality measured within a preset duration is greater than or equal to the threshold value of the cell level.

in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Figure 8:
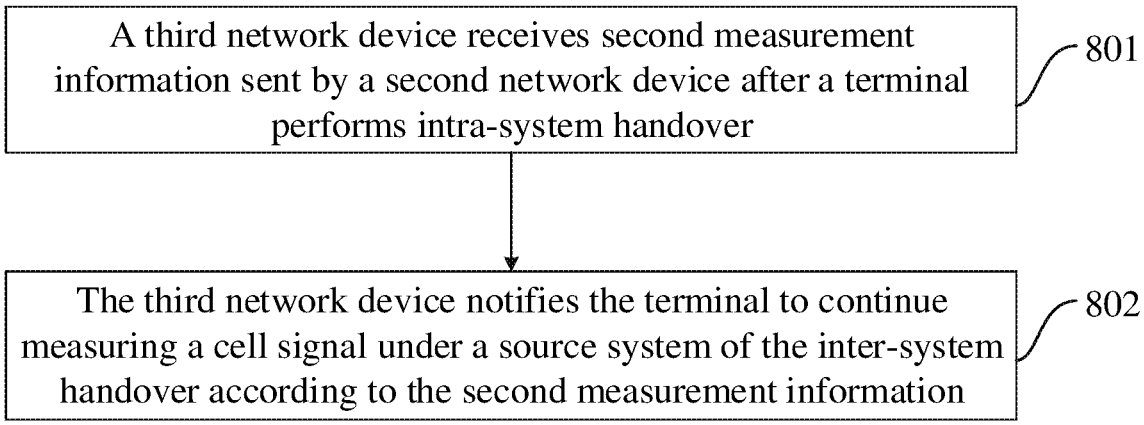
FIG. 8 is one of flow diagrams of a mobility robustness method in an embodiment of the present application.

Based on the same inventive concept, an embodiment of the present application provides another mobility robustness method. Referring to FIG. 8, it is a flow diagram of the mobility robustness method in the embodiment of the present application. The method includes the following steps.

Step 801: a third network device receives second measurement information sent by a second network device after a terminal performs intra-system handover.

Step 802: the third network device notifies the terminal to continue measuring a cell signal under a source system of the inter-system handover according to the second measurement information.

The second network device belongs to a target cell of the inter-system handover, and belongs to a source cell of the intra-system handover; and the third network device belongs to a target cell of the intra-system handover.

Optionally, after the third network device notifies the terminal to continue measuring the cell signal under the source system of the inter-system handover according to the second measurement information, the method further includes: receiving a measurement result sent by the terminal; and in a case that unnecessary HO occurs to the terminal, sending the unnecessary HO to a first network device. The unnecessary HO carries a cell identifier of a cell, meeting a second condition, of the source system.

Optionally, the second measurement information includes part or all of the following: a frequency point needing to be measured by the terminal, remaining measurement time of the terminal, a threshold value of beams, the number of beams greater than the threshold value of the beams needing to be measured, a threshold value of a cell level, a threshold value of beams obtaining cell signal quality and the maximum number of beams exceeding the threshold value, a cell identifier of a source cell of the inter-system handover, and a cell identifier of a cell, meeting a first condition, in cells under the source system.

The cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, the determining that the unnecessary HO occurs to the terminal includes: in a case that the second measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determining that the unnecessary HO occurs to the terminal; where the second condition includes that the cell signal quality measured within the preset duration is greater than or equal to the threshold value of the cell level; or in a case that the second measurement information includes the threshold value of the beams and the number of the beams greater than the threshold value of the beams needing to be measured by the terminal, and the measured number of the beams greater than the threshold value of the beams in the measurement result is greater than or equal to a preset threshold, determining that the unnecessary HO occurs to the terminal; where the second condition includes that the measured number of the beams greater than the threshold value of the beams is greater than or equal to the preset threshold.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

In a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Figure 9:
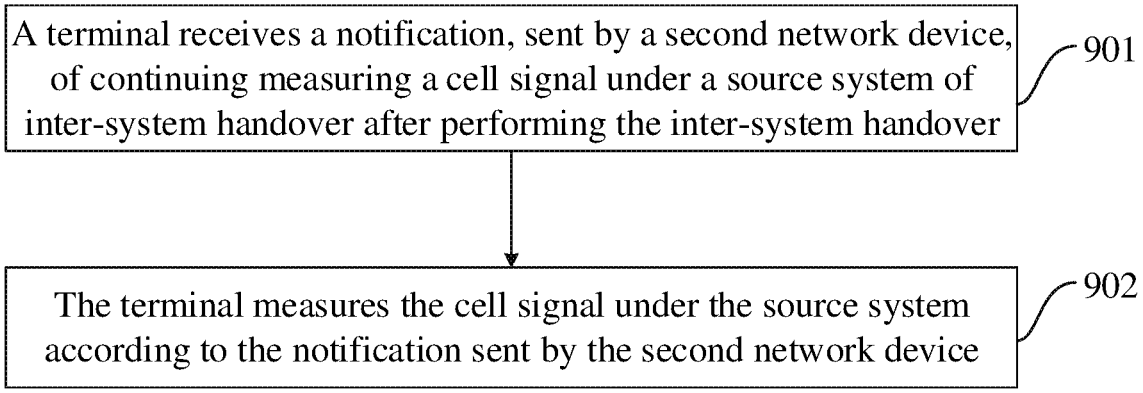
FIG. 9 is one of flow diagrams of a mobility robustness method in an embodiment of the present application.

Based on the same inventive concept, an embodiment of the present application further provides another mobility robustness method. Referring to FIG. 9, it is a flow diagram of the mobility robustness method in the embodiment of the present application. The method includes the following steps.

Step 901: a terminal receives a notification, sent by a second network device, of continuing measuring a cell signal under a source system of inter-system handover after performing the inter-system handover.

Step 902: the terminal measures the cell signal under the source system according to the notification sent by the second network device.

The second network device belongs to a target cell of the inter-system handover belongs.

Optionally, the notification sent by the second network device further includes: first measurement information.

The first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

The terminal sends a measurement result to the second network device.

Optionally, after the terminal measures the cell signal under the source system according to the notification sent by the second network device, the method further includes: when the cell signal under the source system is measured, receiving, by the terminal, a notification, sent by a third network device, of measuring the cell signal under the source system after performing the intra-system handover; and measuring, by the terminal, the cell signal under the source system according to the notification sent by the third network device.

The third network device belongs to a target cell of the intra-system handover.

Optionally, the notification sent by the third network device further includes: second measurement information.

The second measurement information includes part or all of the following: a frequency point needing to be measured by the terminal, remaining measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value, a cell identifier of the source cell of the inter-system handover, and a cell identifier of a cell meeting the first condition.

The cell meeting the first condition is determined by the second network device after receiving first measurement information sent by the first network device, the first measurement information is sent by the first network device after the terminal performs the inter-system handover, and the first network device belongs to the source cell of the inter-system handover.

The terminal sends the measurement result to the third network device.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

In a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Based on the same inventive concept, an embodiment of the present application further provides a first network device.

Figure 10:
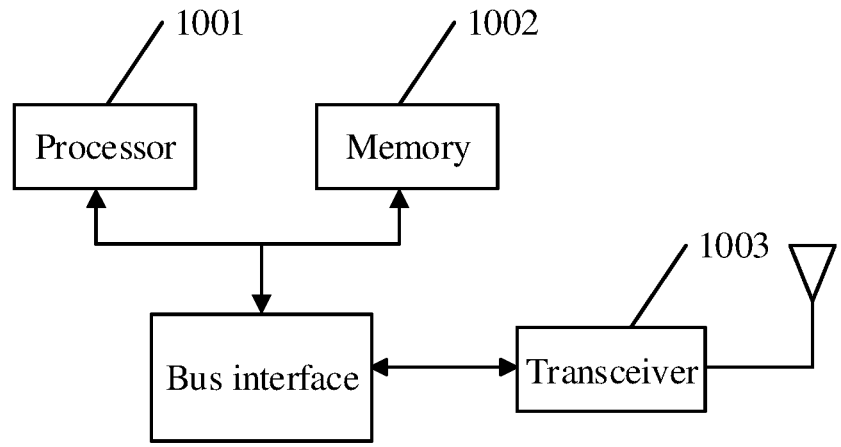
FIG. 10 is a first network device in an embodiment of the present application.

As shown in FIG. 10, the first network device of the embodiment of the present application includes: a processor 1001, a memory 1002 and a transceiver 1003.

The processor 1001 is responsible for managing the bus architecture and general processing, and the memory 1002 stores data used when the processor 1001 executes operations. The transceiver 1003 is configured to receive and send data under the control of the processor 1001.

The bus architecture may include interconnected buses of any number and bridges of any number, which are specifically linked together through various circuits of one or more processors 1001 represented by the processor 1001 and various circuits of memories represented by the memory 1002. The bus architecture may also link various other circuits such as peripheral devices, voltage regulators, and power management circuits, which are well known in the art, and therefore are not further described herein. A bus interface provides an interface. The processor 1001 is responsible for managing the bus architecture and general processing, and the memory 1002 may store data used when the processor 1001 executes operations.

One or more processes disclosed in the embodiments of the present application may be applied to the processor 1001 or implemented by the processor 1001. During an implementation process, all steps of a signal processing flow may be completed by an integrated logic circuit of hardware or an instruction in the form of software in the processor 1001. The processor 1001 may be a general-purpose processor 1001, a digital signal processor 1001, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor 1001 may be a microprocessor 1001 or any conventional processor 1001, etc. The steps of the method disclosed in conjunction with the embodiment of the present application may be directly embodied to be executed and completed by a hardware processor 1001, or may be executed and completed through a combination of hardware and software modules in the processor 1001. The software module may be located in a mature storage medium in the art, such as a random access memory, a flash memory, a read-only memory, a programmable read-only memory, an electrically erasable programmable memory, and a register. The storage medium is located in the memory 1002, and the processor 1001 reads information in the memory 1002 to complete the steps of the target cell determining flow in combination with its hardware.

The processor 1001 is configured to read programs in the memory 1002 and execute the following processes: determining first measurement information after a terminal performs inter-system handover; and sending the determined first measurement information to a second network device to enable the second network device to notify the terminal to continue measuring a cell signal under a source system of the inter-system handover according to the first measurement information.

The first network device belongs to a source cell of the inter-system handover, and the second network device belongs to a target cell of the inter-system handover.

Optionally, the processor is further configured to: in a case that the first network device receives unnecessary HO sent by the second network device after sending the determined first measurement information to the second network device, determine that the unnecessary HO occurs when the terminal performs the inter-system handover. The unnecessary HO carries a cell identifier of a cell, meeting a first condition, in cells under the source system.

Optionally, the first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

Optionally, the processor is further configured to: in a case that unnecessary HO sent by a third network device is received after the determined first measurement information is sent to the second network device, determine that the unnecessary HO occurs when the terminal performs the inter-system handover. The unnecessary HO carries a cell identifier of a cell, meeting a second condition, in cells under the source system.

The cell meeting the second condition is determined by the third network device after receiving second measurement information sent by the second network device, the second measurement information is sent by the second network device after intra-system handover is performed within measurement time of the terminal measuring the cell signal under the source system, and the third network device belongs to a target cell of the intra-system handover.

Optionally, in a case that the second measurement information includes the threshold value of the cell level, the threshold value of the beams obtaining the cell signal quality and the maximum number of the beams exceeding the threshold value, the second condition includes that cell signal quality measured within a preset duration is greater than or equal to the threshold value of the cell level.

In a case that the second measurement information includes the threshold value of the beams and the number of the beams greater than the threshold value of the beams needing to be measured by the terminal, the second condition includes that the measured number of the beams greater than the threshold value of the beams is greater than or equal to a preset threshold.

Since the first network device is the terminal in the method of the embodiment of the present application and the principle of solving problems of the first network device is similar to that of the method, implementation of the first network device may refer to implementation of the system, and repetitions are omitted.

Based on the same inventive concept, an embodiment of the present application provides a second network device.

Figure 11:
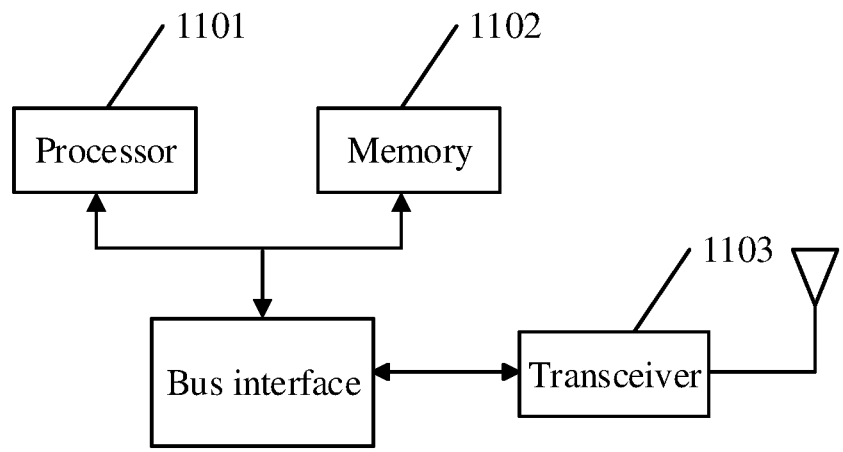
FIG. 11 is a second network device in an embodiment of the present application.

As shown in FIG. 11, the second network device of the embodiment of the present application includes: a processor 1101, a memory 1102 and a transceiver 1103.

The processor 1101 is responsible for managing a bus architecture and general processing, and the memory 1102 stores data used when the processor 1101 executes operations. The transceiver 1103 is configured to receive and send data under the control of the processor 1101.

The bus architecture may include interconnected buses of any number and bridges of any number, which are specifically linked together through various circuits of one or more processors 1101 represented by the processor 1101 and various circuits of memories represented by the memory 1102. The bus architecture may also link various other circuits such as peripheral devices, voltage regulators, and power management circuits, which are well known in the art, and therefore are not further described herein. A bus interface provides an interface. The processor 1101 is responsible for managing the bus architecture and general processing, and the memory 1102 may store data used when the processor 1101 executes operations.

A process disclosed in the embodiments of the present application may be applied to the processor 1101 or implemented by the processor 1101. During an implementation process, all steps of a signal processing flow may be completed by an integrated logic circuit of hardware or an instruction in the form of software in the processor 1101. The processor 1101 may be a general-purpose processor 1101, a digital signal processor 1101, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor 1101 may be a microprocessor 1101 or any conventional processor 1101, etc. The steps of the method disclosed in conjunction with the embodiment of the present application may be directly embodied to be executed and completed by a hardware processor 1101, or may be executed and completed through a combination of hardware and software modules in the processor 1101. The software module may be located in a mature storage medium in the art, such as a random access memory, a flash memory, a read-only memory, a programmable read-only memory, an electrically erasable programmable memory, and a register. The storage medium is located in the memory 1102, and the processor 1101 reads information in the memory 1102 to complete the steps of the target cell determining flow in combination with its hardware.

The processor 1101 is configured to read programs in the memory 1102 and execute the following processes: receiving first measurement information sent by a first network device after a terminal performs inter-system handover; and notifying the terminal to continue measuring a cell signal under a source system of the inter-system handover according to the first measurement information.

The first network device belongs to a source cell of the inter-system handover, and the second network device belongs to a target cell of the inter-system handover.

Optionally, the processor is further configured to: receive a measurement result sent by the terminal after notifying the terminal to continue measuring the cell signal under the source system of the inter-system handover according to the first measurement information; and in a case that unnecessary HO occurs to the terminal, send the unnecessary HO to the first network device. The unnecessary HO carries a cell identifier of a cell, meeting a first condition, in cells under the source system.

Optionally, the first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

Optionally, the processor is further configured to: in a case that the first measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determine that the unnecessary HO occurs to the terminal; where the first condition includes that the cell signal quality measured within the preset duration is greater than or equal to the threshold value of the cell level; or in a case that the first measurement information includes the threshold value of the beams and the number of the beams greater than the threshold value of the beams needing to be measured by the terminal, and the measured number of the beams greater than the threshold value of the beams in the measurement result is greater than or equal to a preset threshold, determine that the unnecessary HO occurs to the terminal; where the first condition includes that the measured number of the beams greater than the threshold value of the beams is greater than or equal to the preset threshold.

Optionally, the processor is further configured to: determine second measurement information after notifying the terminal to continue measuring the cell signal under the source system of the inter-system handover according to the first measurement information and after the terminal performs intra-system handover; and send the determined second measurement information to a third network device to enable the third network device to notify the terminal to continue measuring the cell signal under the source system of the inter-system handover according to the second measurement information.

The third network device belongs to a target cell of the intra-system handover.

Optionally, the second measurement information further includes part or all of the following: a frequency point needing to be measured by the terminal, remaining measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value, a cell identifier of the source cell of the inter-system handover, and a cell identifier of a cell meeting the first condition.

The cell meeting the first condition is determined by the second network device after receiving the first measurement information sent by the first network device, the first measurement information is sent by the first network device after the terminal performs the inter-system handover, and the first network device is belongs to the source cell of the inter-system handover.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

In a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Since the second network device is the terminal in the method of the embodiment of the present application and the principle of solving problems of the second network device is similar to that of the method, implementation of the second network device may refer to implementation of the system, and repetitions are omitted.

Based on the same inventive concept, an embodiment of the present application provides a third network device.

Figure 12:
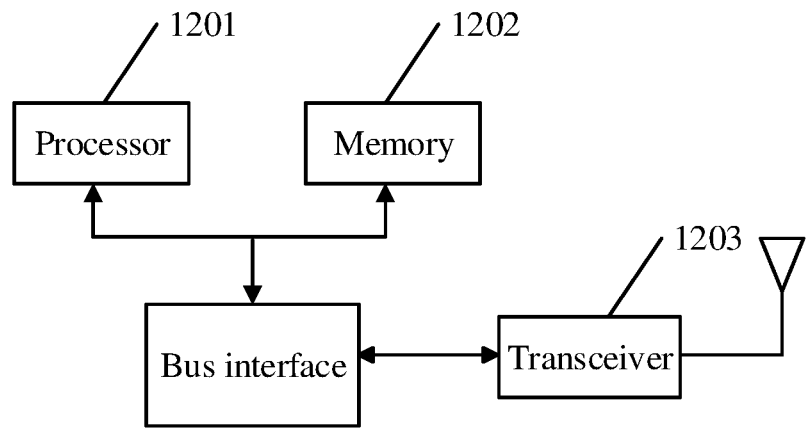
FIG. 12 is a third network device in an embodiment of the present application.

As shown in FIG. 12, the third network device of the embodiment of the present application includes: a processor 1201, a memory 1202 and a transceiver 1203.

The processor 1201 is responsible for managing a bus architecture and general processing, and the memory 1202 stores data used when the processor 1201 executes operations. The transceiver 1203 is configured to receive and send data under the control of the processor 1201.

The bus architecture may include interconnected buses of any number and bridges of any number, which are specifically linked together through various circuits of one or more processors 1201 represented by the processor 1201 and various circuits of memories represented by the memory 1202. The bus architecture may also link various other circuits such as peripheral devices, voltage regulators, and power management circuits, which are well known in the art, and therefore are not further described herein. A bus interface provides an interface. The processor 1201 is responsible for managing the bus architecture and general processing, and the memory 1202 may store data used when the processor 1201 executes operations.

A process disclosed in the embodiments of the present application may be applied to the processor 1201 or implemented by the processor 1201. During an implementation process, all steps of a signal processing flow may be completed by an integrated logic circuit of hardware or an instruction in the form of software in the processor 1201. The processor 1201 may be a general-purpose processor 1201, a digital signal processor 1201, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor 1201 may be a microprocessor 1201 or any conventional processor 1201, etc. The steps of the method disclosed in conjunction with the embodiment of the present application may be directly embodied to be executed and completed by a hardware processor 1201, or may be executed and completed through a combination of hardware and software modules in the processor 1201. The software module may be located in a mature storage medium in the art, such as a random access memory, a flash memory, a read-only memory, a programmable read-only memory, an electrically erasable programmable memory, and a register. The storage medium is located in the memory 1202, and the processor 1201 reads information in the memory 1202 to complete the steps of the target cell determining flow in combination with its hardware.

The processor 1201 is configured to read programs in the memory 1202 and execute the following processes: receiving second measurement information sent by a second network device after a terminal performs intra-system handover; and notifying the terminal to continue measuring a cell signal under a source system of inter-system handover according to the second measurement information.

The second network device belongs to a target cell of the inter-system handover, and belongs to a source cell of the intra-system handover; and the third network device belongs to a target cell of the intra-system handover.

Optionally, the processor is further configured to: receive a measurement result sent by the terminal after notifying the terminal to continue measuring the cell signal under the source system of the inter-system handover according to the second measurement information; and in a case that that unnecessary HO occurs to the terminal, send the unnecessary HO to a first network device. The unnecessary HO carries a cell identifier of a cell, meeting a second condition, in cells of the source system.

Optionally, the second measurement information includes part or all of the following: a frequency point needing to be measured by the terminal, remaining measurement time of the terminal, a threshold value of beams, the number of beams greater than the threshold value of the beams needing to be measured, a threshold value of a cell level, a threshold value of beams obtaining cell signal quality and the maximum number of beams exceeding the threshold value, a source cell identifier of the inter-system handover, and a cell identifier of a cell, meeting a first condition, in cells under the source system.

The cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, the processor is further configured to: in a case that the second measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determine that the unnecessary HO occurs to the terminal; where the second condition includes that the cell signal quality measured within the preset duration is greater than or equal to the threshold value of the cell level; or in a case that the second measurement information includes the threshold value of the beams and the number of the beams greater than the threshold value of the beams needing to be measured by the terminal, and the measured number of the beams greater than the threshold value of the beams in the measurement result is greater than or equal to a preset threshold, determine that the unnecessary HO occurs to the terminal; where the second condition includes that the measured number of the beams greater than the threshold value of the beams is greater than or equal to the preset threshold.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

In a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Since the third network device is the terminal in the method of the embodiment of the present application and the principle of solving problems of the third network device is similar to that of the method, implementation of the third network device may refer to implementation of the method, for example, the third network device may be implemented as an embodiment of the system, and repetitions are omitted.

Based on the same inventive concept, an embodiment of the present application provides a terminal.

Figure 13:
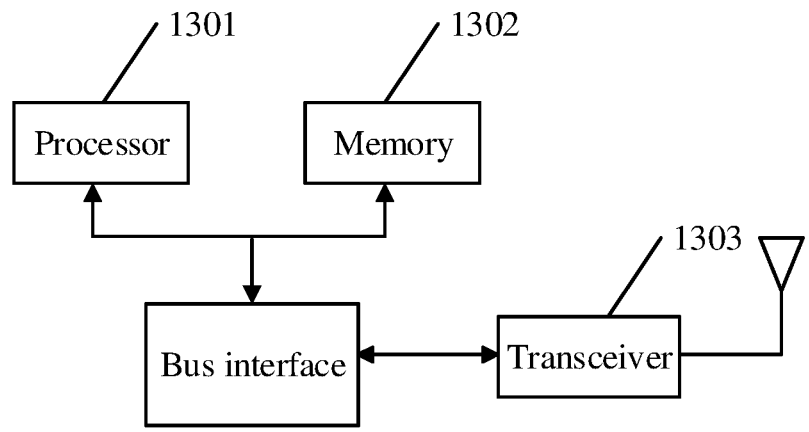
FIG. 13 is a terminal in an embodiment of the present application.

As shown in FIG. 13, the terminal of the embodiment of the present application includes: a processor 1301, a memory 1302 and a transceiver 1303.

The processor 1301 is responsible for managing a bus architecture and general processing, and the memory 1302 stores data used when the processor 1301 executes operations. The transceiver 1303 is configured to receive and send data under the control of the processor 1301.

The bus architecture may include interconnected buses of any number and bridges of any number, which are specifically linked together through various circuits of one or more processors 1301 represented by the processor 1301 and various circuits of memories represented by the memory 1302. The bus architecture may also link various other circuits such as peripheral devices, voltage regulators, and power management circuits, which are well known in the art, and therefore are not further described herein. A bus interface provides an interface. The processor 1301 is responsible for managing the bus architecture and general processing, and the memory 1302 may store data used when the processor 1301 executes operations.

A process disclosed in the embodiments of the present application may be applied to the processor 1301 or implemented by the processor 1301. During an implementation process, all steps of a signal processing flow may be completed by an integrated logic circuit of hardware or an instruction in the form of software in the processor 1301. The processor 1301 may be a general-purpose processor 1301, a digital signal processor 1301, an application specific integrated circuit, a field programmable gate array or other programmable logic devices, a discrete gate or a transistor logic device, or a discrete hardware component, and may implement or execute methods, steps and logic block diagrams disclosed in the embodiments of the present application. The general-purpose processor 1301 may be a microprocessor 1301 or any conventional processor 1301, etc. The steps of the method disclosed in conjunction with the embodiment of the present application may be directly embodied to be executed and completed by a hardware processor 1301, or may be executed and completed through a combination of hardware and software modules in the processor 1301. The software module may be located in a mature storage medium in the art, such as a random access memory, a flash memory, a read-only memory, a programmable read-only memory, an electrically erasable programmable memory, and a register. The storage medium is located in the memory 1302, and the processor 1301 reads information in the memory 1302 to complete the steps of the target cell determining flow in combination with its hardware.

The processor 1301 is configured to read programs in the memory 1302 and execute the following processes: receiving a notification, sent by a second network device, of continuing measuring a cell signal under a source system of inter-system handover after the inter-system handover is performed; and measuring the cell signal under the source system according to the notification sent by the second network device.

The second network device belongs to a target cell of the inter-system handover.

Optionally, the notification sent by the second network device further includes: first measurement information.

The first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

The processor is further configured to: send a measurement result to the second network device.

Optionally, the processor is further configured to: when the cell signal under the source system is measured, receive a notification, sent by a third network device, of measuring the cell signal under the source system after measuring the cell signal under the source system according to the notification sent by the second network device and after performing the intra-system handover; and measure the cell signal under the source system according to the notification sent by the third network device.

The third network device belongs to a target cell of the intra-system handover.

Optionally, the notification sent by the third network device further includes: second measurement information.

The second measurement information includes part or all of the following: a frequency point needing to be measured by the terminal, remaining measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value, a cell identifier of the source cell of the inter-system handover, and a cell identifier of a cell meeting the first condition.

The cell meeting the first condition is determined by the second network device after receiving first measurement information sent by the first network device, the first measurement information is sent by the first network device after the terminal performs the inter-system handover, and the first network device belongs to the source cell of the inter-system handover.

The terminal sends the measurement result to the third network device.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

In a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Since the terminal is the terminal in the method of the embodiment of the present application and the principle of solving problems of the terminal is similar to that of the method, implementation of the terminal may refer to implementation of the system, and repetitions are omitted.

Figure 14:
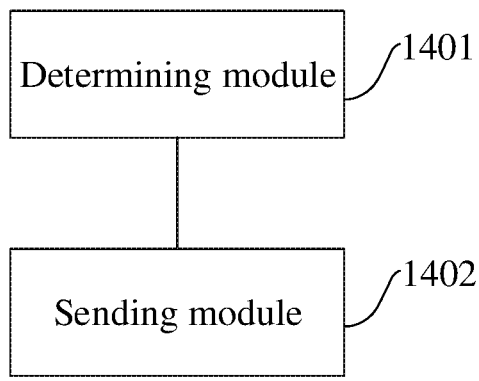
FIG. 14 is one of schematic diagrams of a mobility robustness apparatus in an embodiment of the present application.

Based on the same inventive concept, an embodiment of the present application provides a mobility robustness apparatus. Referring to FIG. 14, it is a schematic diagram of the mobility robustness apparatus in the embodiment of the present application. The mobility robustness apparatus includes: a determining module 1401 and a sending module 1402.

The determining module 1401 is configured to determine first measurement information after a terminal performs inter-system handover.

The sending module 1402 is configured to send the determined first measurement information to a second network device to enable the second network device to notify the terminal to continue measuring a cell signal under a source system of the inter-system handover according to the first measurement information.

The first network device belongs to a source cell of the inter-system handover, and the second network device belongs to a target cell of the inter-system handover.

Optionally, the determining module is further configured to: in a case that unnecessary HO sent by the second network device is received after the determined first measurement information is sent to the second network device, determine that the unnecessary HO occurs when the terminal performs the inter-system handover. The unnecessary HO carries a cell identifier of a cell, meeting a first condition, in cells under the source system.

Optionally, the first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

in a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Optionally, the determining module is further configured to: in a case that unnecessary HO sent by a third network device is received after the determined first measurement information is sent to the second network device, determine that the unnecessary HO occurs when the terminal performs the inter-system handover. The unnecessary HO carries a cell identifier of a cell, meeting a second condition, in cells under the source system.

The cell meeting the second condition is determined by the third network device after receiving second measurement information sent by the second network device, the second measurement information is sent by the second network device after the intra-system handover is performed within measurement time of the terminal measuring the cell signal under the source system, and the third network device belongs to a target cell of the intra-system handover.

Optionally, in a case that the second measurement information includes the threshold value of the cell level, the threshold value of the beams obtaining the cell signal quality and the maximum number of the beams exceeding the threshold value, the second condition includes that cell signal quality measured within a preset duration is greater than or equal to the threshold value of the cell level.

In a case that the second measurement information includes the threshold value of the beams and the number of the beams greater than the threshold value of the beams needing to be measured by the terminal, the second condition includes that the measured number of the beams greater than the threshold value of the beams is greater than or equal to a preset threshold.

Figure 15:
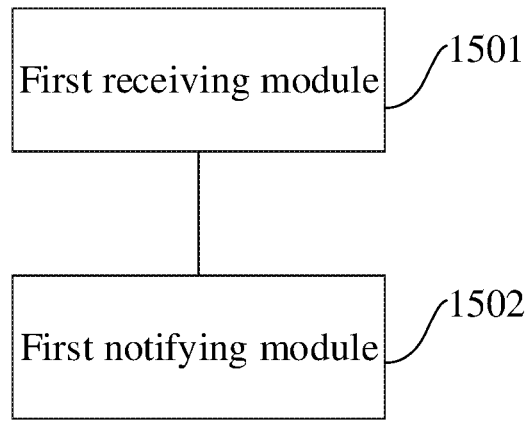
FIG. 15 is one of schematic diagrams of a mobility robustness apparatus in an embodiment of the present application.

Based on the same inventive concept, an embodiment of the present application provides a mobility robustness apparatus. Referring to FIG. 15, it is a schematic diagram of the mobility robustness apparatus in the embodiment of the present application. The mobility robustness apparatus includes: a first receiving module 1501 and a first notifying module 1502.

The first receiving module 1501 is configured to receive first measurement information sent by a first network device after a terminal performs inter-system handover.

The first notifying module 1502 is configured to notify the terminal to continue measuring a cell signal under a source system of the inter-system handover according to the first measurement information.

The first network device belongs to a source cell of the inter-system handover, and the second network device belongs to a target cell of the inter-system handover.

Optionally, the first receiving module is further configured to: receive a measurement result sent by the terminal after notifying the terminal to continue measuring the cell signal under the source system of the inter-system handover according to the first measurement information.

The first notifying module is further configured to: in a case that unnecessary HO occurs to the terminal, send the unnecessary HO to the first network device. The unnecessary HO carries a cell identifier of a cell, meeting a first condition, in cells under the source system.

Optionally, the first measurement information includes part or all of the following: a frequency point needing to be measured by the terminal, measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value.

Optionally, determining that the unnecessary HO occurs to the terminal includes: in a case that the first measurement information includes the threshold value of the cell level, the threshold value of the beams obtaining the cell signal quality and the maximum number of the beams exceeding the threshold value, and cell signal quality measured within a preset duration in the measurement result is greater than or equal to the threshold value of the cell level, determining that the unnecessary HO occurs to the terminal; where the first condition includes that the cell signal quality measured within the preset duration is greater than or equal to the threshold value of the cell level; or in a case that the first measurement information includes the threshold value of the beams and the number of the beams greater than the threshold value of the beams needing to be measured by the terminal, and the measured number of the beams greater than the threshold value of the beams in the measurement result is greater than or equal to a preset threshold, determining that the unnecessary HO occurs to the terminal; where the first condition includes that the measured number of the beams greater than the threshold value of the beams is greater than or equal to the preset threshold.

Optionally, the apparatus further includes: a second determining module, configured to determine second measurement information after the terminal is notified to continue measuring the cell signal under the source system of the inter-system handover according to the first measurement information and after the terminal performs intra-system handover.

The first notifying module is further configured to send the determined second measurement information to a third network device to enable the third network device to notify the terminal to continue measuring the cell signal under the source system of the inter-system handover according to the second measurement information.

The third network device belongs to a target cell of the intra-system handover.

Optionally, the second measurement information includes part or all of the following: a frequency point needing to be measured by the terminal, remaining measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value, a cell identifier of the source cell of the inter-system handover, and a cell identifier of a cell meeting the first condition.

The cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

In a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Figure 16:
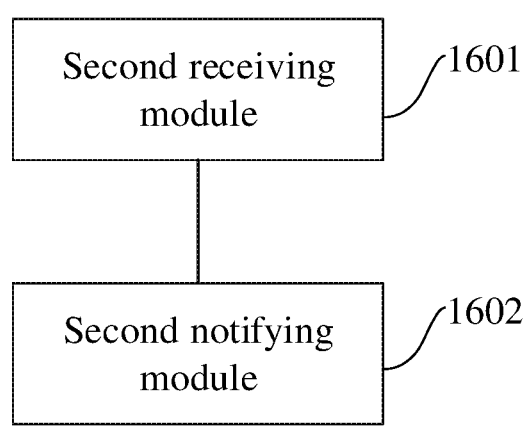
FIG. 16 is one of schematic diagrams of a mobility robustness apparatus in an embodiment of the present application.

Based on the same inventive concept, an embodiment of the present application provides a mobility robustness apparatus. Referring to FIG. 16, it is a schematic diagram of the mobility robustness apparatus in the embodiment of the present application. The mobility robustness apparatus includes: a second receiving module 1601 and a second notifying module 1602.

The second receiving module 1601 is configured to receive second measurement information sent by a second network device after a terminal performs intra-system handover.

The second notifying module 1602 is configured to notify the terminal to continue measuring a cell signal under a source system of inter-system handover according to the second measurement information.

The second network device belongs to a target cell of the inter-system handover, and belongs to a source cell of the intra-system handover; and the third network device belongs to a target cell of the intra-system handover.

Optionally, the second receiving module is further configured to: receive a measurement result sent by the terminal after the terminal is notified to continue measuring the cell signal under the source system of the inter-system handover according to the second measurement information.

The second notifying module is further configured to: in a case that unnecessary HO occurs to the terminal, send the unnecessary HO to a first network device. The unnecessary HO carries a cell identifier of a cell, meeting a second condition, in cells of the source system.

Optionally, the second measurement information includes part or all of the following: a frequency point needing to be measured by the terminal, remaining measurement time of the terminal, a threshold value of beams, the number of beams greater than the threshold value of the beams needing to be measured, a threshold value of a cell level, a threshold value of beams obtaining cell signal quality and the maximum number of beams exceeding the threshold value, a source cell identifier of the inter-system handover, and a cell identifier of a cell, meeting a first condition, in cells under the source system.

The cell meeting the first condition is determined by the second network device after receiving the first measurement information sent by the first network device, the first measurement information is sent by the first network device after the terminal performs the inter-system handover, and the first network device belongs to the source cell of the inter-system handover.

Optionally, determining that the unnecessary HO occurs to the terminal includes: in a case that the second measurement information includes the threshold value of the beams and the number of the beams greater than the threshold value of the beams needing to be measured by the terminal, and cell signal quality measured within a preset duration in the measurement result is greater than or equal to the threshold value of the cell level, determining that the unnecessary HO occurs to the terminal; where the second condition includes that the cell signal quality measured within the preset duration is greater than or equal to the threshold value of the cell level; or in a case that the second measurement information includes the threshold value of the beams and the number of the beams greater than the threshold value of the beams needing to be measured by the terminal, and the measured number of the beams greater than the threshold value of the beams in the measurement result is greater than or equal to a preset threshold, determining that the unnecessary HO occurs to the terminal; where the second condition includes that the measured number of the beams greater than the threshold value of the beams is greater than or equal to the preset threshold.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

In a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

Figure 17:
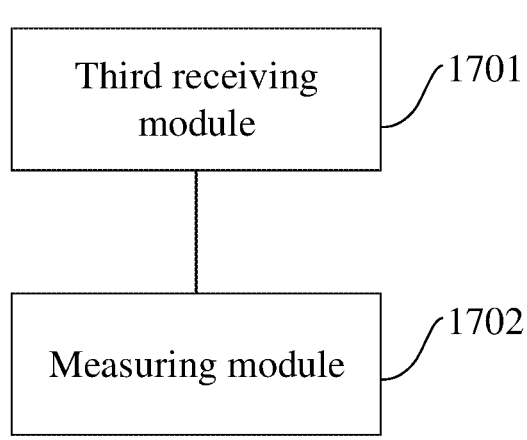
FIG. 17 is one of schematic diagrams of a mobility robustness apparatus in an embodiment of the present application.

Based on the same inventive concept, an embodiment of the present application provides a mobility robustness apparatus. Referring to FIG. 17, it is a schematic diagram of the mobility robustness apparatus in the embodiment of the present application. The mobility robustness apparatus includes: a third receiving module 1701 and a measuring module 1702.

The third receiving module 1701 is configured to receive a notification, sent by a second network device, of continuing measuring a cell signal under a source system of inter-system handover after performing the inter-system handover.

The measuring module 1702 is configured to measure the cell signal under the source system according to the notification sent by the second network device.

The second network device belongs to a target cell of the inter-system handover.

Optionally, the notification sent by the second network device further includes: first measurement information.

The first measurement information includes part or all of the following: a frequency point needing to be measured by the terminal, measurement time of the terminal, a threshold value of beams, the number of beams greater than the threshold value of beams needing to be measured by the terminal, a threshold value of a cell level, a threshold value of beams obtaining cell signal quality and the maximum number of beams exceeding the threshold value.

The terminal sends a measurement result to the second network device.

Optionally, the third receiving module is further configured to: when the cell signal under the source system is measured, receive a notification, sent by a third network device, of measuring the cell signal under the source system after the cell signal under the source system is measured according to the notification sent by the second network device and after the intra-system handover is performed.

The measuring module is further configured to measure the cell signal under the source system according to the notification sent by the third network device.

The third network device belongs to a target cell of the intra-system handover.

Optionally, the notification sent by the third network device further includes: second measurement information.

The second measurement information includes part or all of the following: a frequency point needing to be measured by the terminal, remaining measurement time of the terminal, a threshold value of beams, the number of beams greater than the threshold value of the beams needing to be measured by the terminal, a threshold value of a cell level, a threshold value of beams obtaining cell signal quality and the maximum number of beams exceeding the threshold value, a cell identifier of the source cell of the inter-system handover, and a cell identifier of a cell meeting the first condition.

The cell meeting the first condition is determined by the second network device after receiving first measurement information sent by the first network device, the first measurement information is sent by the first network device after the terminal performs the inter-system handover, and the first network device belongs to the source cell of the inter-system handover.

The terminal sends the measurement result to the third network device.

Optionally, in a case that the first measurement information includes the threshold value of the cell level, the threshold value of the beams obtaining the cell signal quality and the maximum number of the beams exceeding the threshold value, the first condition includes that the cell signal quality measured within the preset duration is greater than or equal to the threshold value of the cell level.

In a case that the first measurement information includes the threshold value of the beams and the number of the beams greater than the threshold value of the beams needing to be measured by the terminal, the first condition includes that the measured number of the beams greater than the threshold value of the beams is greater than or equal to a preset threshold.

An embodiment of the present application further provides a computer-readable non-transitory storage medium, including program codes. When the program codes run on a computing terminal, the program codes are used to enable the computing terminal to execute the steps of the mobility robustness method of the above embodiment of the present application.

The present application is described above with reference to block diagrams and/or flow diagrams of methods, apparatuses (systems) and/or computer program products according to the embodiments of the present application. It should be understood that a block of the block diagrams and/or flow diagrams and a combination of blocks of the block diagrams and/or the flow diagrams can be implemented by computer program instructions. These computer program instructions may be provided for a processor of a general-purpose computer and a special-purpose computer and/or other programmable data processing apparatuses to produce a machine, so that instructions executed by the processor of the computer and/or other programmable data processing apparatuses create a method for implementing a function/action specified in blocks of the block diagrams and/or flow diagrams.

Correspondingly, the present application may be further implemented through hardware and/or software (including firmware, resident software, microcodes, etc.). Further, the present application may take the form of a computer program product on a computer usable or computer readable storage medium having computer usable or computer readable program codes implemented in the medium for use by or in combination with an instruction execution system. In the context of the present application, a computer usable or computer-readable medium may be any medium that may contain, store, communicate, transmit, or convey a program for use by, or in combination with, an instruction execution system, apparatus, or device.

Apparently, those skilled in the art can make various modifications and variations to the present application without departing from the spirit and scope of the present application. In this way, under the condition that these modifications and variations of the present application fall within the scope of the claims of the present application and their equivalent technologies, the present application is also intended to include these modifications and variations.

What is claimed is:

1. A mobility robustness method, comprising:
   determining, by a first network device, first measurement information after during a terminal performing inter-system handover; and
   sending, by the first network device, the first measurement information to a second network device, to enable the second network device to notify the terminal to continue measuring a cell signal under a source system of the inter-system handover according to the first measurement information;
   wherein the first network device belongs to a source cell of the inter-system handover, and the second network device belongs to a target cell of the inter-system handover;
   wherein after the sending, by the first network device, the first measurement information to the second network device, the method further comprises:
   in a case that the first network device receives unnecessary HO sent by a third network device, determining that the unnecessary HO occurs when the terminal performs the inter-system handover, wherein the unnecessary HO carries a cell identifier of a cell, meeting a second condition, in cells of the source system;
   wherein the cell meeting the second condition is determined by the third network device after receiving second measurement information sent by the second network device, the second measurement information is sent by the second network device after the intra-system handover is performed within measurement time of the terminal measuring the cell signal under the source system, and the third network device belongs to the target cell of the intra-system handover; wherein
   in a case that the second measurement information comprises a threshold value of a cell level, a threshold value of beams obtaining cell signal quality and a maximum quantity of beams exceeding the threshold value, the second condition comprises that cell signal quality measured within a preset duration is greater than or equal to the threshold value of the cell level; and
   in a case that the second measurement information comprises a threshold value of beams and a quantity of beams greater than a threshold value of beams needing to be measured by the terminal, the second condition comprises that a measured quantity of beams greater than the threshold value of the beams is greater than or equal to a preset threshold.

2. The method according to claim 1, wherein after the sending, by the first network device, the first measurement information to the second network device, the method further comprises:
   in a case that the first network device receives unnecessary handover (unnecessary HO) sent by the second network device, determining that the unnecessary HO occurs when the terminal performs the inter-system handover, wherein the unnecessary HO carries a cell identifier of a cell, meeting a first condition, in cells of the source system.

3. The method according to claim 2, wherein the first measurement information comprises part or all of the following:
   a frequency point needing to be measured by the terminal, measurement time of the terminal, a threshold value of beams, a quantity of beams greater than a threshold value of beams needing to be measured by the terminal, a threshold value of a cell level, a threshold value of beams obtaining cell signal quality and a maximum quantity of beams exceeding the threshold value.

4. The method according to claim 3, wherein
   in a case that the first measurement information comprises the threshold value of the cell level, the threshold value of the beams obtaining the cell signal quality and the maximum quantity of the beams exceeding the threshold value, the first condition comprises that cell signal quality measured within a preset duration is greater than or equal to the threshold value of the cell level; and
   in a case that the first measurement information comprises the threshold value of the beams and the quantity of the beams greater than the threshold value of the beams needing to be measured by the terminal, the first condition comprises that a measured quantity of beams greater than the threshold value of the beams is greater than or equal to a preset threshold.

5. A first network device, comprising: a processor and a memory; wherein
   the processor is configured to read programs in the memory and execute the method of claim 1.

6. The device according to claim 5, wherein the processor is further configured to:
   in a case that the first network device receives unnecessary HO sent by the second network device after sending the first measurement information to the second network device, determine that the unnecessary HO occurs when the terminal performs the inter-system handover, wherein the unnecessary HO carries a cell identifier of a cell, meeting a first condition, in cells of the source system.

7. The device according to claim 6, wherein the first measurement information comprises part or all of the following:
   a frequency point needing to be measured by the terminal, measurement time of the terminal, a threshold value of beams, a quantity of beams greater than a threshold value of beams needing to be measured by the terminal, a threshold value of a cell level, a threshold value of beams obtaining cell signal quality and a maximum quantity of beams exceeding a threshold value.

8. A mobility robustness method, comprising:
   receiving, by a second network device, first measurement information sent by a first network device during a terminal performing inter-system handover; and
   notifying, by the second network device, the terminal to continue measuring a cell signal under a source system of the inter-system handover according to the first measurement information;
   wherein the first network device belongs to a source cell of the inter-system handover, and the second network device belongs to a target cell of the inter-system handover;
   wherein after the notifying, by the second network device, the terminal to continue measuring the cell signal under the source system of the inter-system handover according to the first measurement information, the method further comprises:
   determining, by the second network device, second measurement information after the terminal performs the intra-system handover; and
   sending, by the second network device, the second measurement information to a third network device, to enable the third network device to notify the terminal to continue measuring the cell signal under the source system of the inter-system handover according to the second measurement information, and sending, by the second network device, unnecessary HO to the first network device when determining that the unnecessary HO occurs in the terminal after receiving a measurement result from the terminal, wherein the unnecessary HO carries a cell identifier of a cell, meeting a second condition, in cells of the source system;

wherein the third network device belongs to a target cell of the intra-system handover;

wherein the second measurement information comprises part or all of the following:

a frequency point needing to be measured by the terminal, remaining measurement time of the terminal, a threshold value of beams, a quantity of beams greater than a threshold value of beams needing to be measured by the terminal, a threshold value of a cell level, a threshold value of beams obtaining cell signal quality and a maximum quantity of beams exceeding the threshold value, a cell identifier of a source cell of the inter-system handover, and a cell identifier of a cell meeting a first condition;

wherein the cell meeting the first condition is determined by the second network device after receiving the first measurement information sent by the first network device, the first measurement information is sent by the first network device after the terminal performs the inter-system handover, and the first network device belongs to the source cell of the inter-system handover; wherein in a case that the second measurement information comprises a threshold value of a cell level, a threshold value of beams obtaining cell signal quality and a maximum quantity of beams exceeding the threshold value, the second condition comprises that cell signal quality measured within a preset duration is greater than or equal to the threshold value of the cell level; and in a case that the second measurement information comprises a threshold value of beams and a quantity of beams greater than a threshold value of beams needing to be measured by the terminal, the second condition comprises that a measured quantity of beams greater than the threshold value of the beams is greater than or equal to a preset threshold.

9. The method according to claim 8, wherein after the notifying, by the second network device, the terminal to continue measuring the cell signal under the source system of the inter-system handover according to the first measurement information, the method further comprises:

receiving a measurement result sent by the terminal; and in a case that unnecessary HO occurs to the terminal, sending the unnecessary HO to the first network device, wherein the unnecessary HO carries a cell identifier of a cell, meeting a first condition, in cells of the source system.

10. The method according to claim 9, wherein the first measurement information comprises part or all of the following:

a frequency point needing to be measured by the terminal, measurement time of the terminal, a threshold value of beams, a quantity of beams greater than a threshold value of beams needing to be measured by the terminal, a threshold value of a cell level, a threshold value of beams obtaining cell signal quality and a maximum quantity of beams exceeding the threshold value.

11. The method according to claim 10, wherein determining that the unnecessary HO occurs to the terminal comprises:

in a case that the first measurement information comprises the threshold value of the cell level, the threshold value of the beams obtaining the cell signal quality and the maximum quantity of the beams exceeding the threshold value, and cell signal quality measured within a preset duration in the measurement result is greater than or equal to the threshold value of the cell level, determining that the unnecessary HO occurs to the terminal, wherein the first condition comprises that the cell signal quality measured within the preset duration is greater than or equal to the threshold value of the cell level; or in a case that the first measurement information comprises the threshold value of the beams and the quantity of the beams greater than the threshold value of the beams needing to be measured by the terminal, and a measured quantity of beams greater than the threshold value of the beams in the measurement result is greater than or equal to a preset threshold, determining that the unnecessary HO occurs to the terminal, wherein the first condition comprises that the measured quantity of the beams greater than the threshold value of the beams is greater than or equal to the preset threshold.

12. The method according to claim 8, wherein in a case that the first measurement information comprises the threshold value of the cell level, the threshold value of the beams obtaining the cell signal quality and the maximum quantity of the beams exceeding the threshold value, the first condition comprises that cell signal quality measured within a preset duration is greater than or equal to the threshold value of the cell level; and in a case that the first measurement information comprises the threshold value of the beams and the quantity of the beams greater than the threshold value of the beams needing to be measured by the terminal, the first condition comprises that a measured quantity of beams greater than the threshold value of the beams is greater than or equal to a preset threshold.

13. A second network device, comprising: a processor and a memory; wherein the processor is configured to read programs in the memory and execute the method of claim 8.

14. The device according to claim 13, wherein the processor is further configured to:

receive a measurement result sent by the terminal after notifying the terminal to continue measuring the cell signal under the source system of the inter-system handover according to the first measurement information; and in a case that unnecessary HO occurs to the terminal, send the unnecessary HO to the first network device, wherein the unnecessary HO carries a cell identifier of a cell, meeting a first condition, in cells of the source system;

wherein the first measurement information comprises part or all of the following:

a frequency point needing to be measured by the terminal, measurement time of the terminal, a threshold value of beams, a quantity of beams greater than a threshold value of beams needing to be measured by the terminal, a threshold value of a cell level, a threshold value of beams obtaining cell signal quality and a maximum quantity of beams exceeding a threshold value.

15. A mobility robustness method, comprising:

receiving, by a terminal, a notification, sent by a second network device, of continuing measuring a cell signal under a source system of inter-system handover during performing the inter-system handover; and measuring, by the terminal, the cell signal under the source system according to the notification sent by the second network device;

wherein the second network device belongs to a target cell of the inter-system handover;

wherein after the measuring, by the terminal, the cell signal under the source system according to the notification sent by the second network device, the method further comprises:

receiving, by the terminal, a notification sent by a third network device, of measuring the cell signal under the source system after performing the intra-system handover when measuring the cell signal under the source system; and measuring, by the terminal, the cell signal under the source system according to the notification sent by the third network device, and sending, by the terminal, a measurement result to the third network device, to enable the third network device, after receiving the measurement result from the terminal, to send unnecessary HO to a first network device when determining that the unnecessary HO occurs when the terminal performs the inter-system handover, wherein the unnecessary HO carries a cell identifier of a cell, meeting a second condition, in cells of the source system; wherein the cell meeting the second condition is determined by the third network device after receiving second measurement information sent by the second network device, the second measurement information is sent by the second network device after the intra-system handover is performed within measurement time of the terminal measuring the cell signal under the source system, and the third network device belongs to a target cell of the intra-system handover; wherein in a case that the second measurement information comprises a threshold value of a cell level, a threshold value of beams obtaining cell signal quality and a maximum quantity of beams exceeding the threshold value, the second condition comprises that cell signal quality measured within a preset duration is greater than or equal to the threshold value of the cell level; and in a case that the second measurement information comprises a threshold value of beams and a quantity of beams greater than a threshold value of beams needing to be measured by the terminal, the second condition comprises that a measured quantity of beams greater than the threshold value of the beams is greater than or equal to a preset threshold.

* * * * *